United States Patent
Yu et al.

(10) Patent No.: US 9,927,967 B2
(45) Date of Patent: Mar. 27, 2018

(54) MOBILE TERMINAL AND METHOD FOR CONTROLLING THE SAME

(71) Applicant: LG ELECTRONICS INC., Seoul (KR)

(72) Inventors: Donghwan Yu, Seoul (KR); Seojin Lee, Seoul (KR); Samsick Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 305 days.

(21) Appl. No.: 14/747,760

(22) Filed: Jun. 23, 2015

(65) Prior Publication Data

US 2016/0154559 A1    Jun. 2, 2016

(30) Foreign Application Priority Data

Nov. 27, 2014   (KR) ........................ 10-2014-0167706

(51) Int. Cl.
| | |
|---|---|
| *G06F 3/0486* | (2013.01) |
| *G06F 3/0488* | (2013.01) |
| *G06F 3/0482* | (2013.01) |
| *G06F 3/0481* | (2013.01) |
| *G06F 3/0484* | (2013.01) |

(52) U.S. Cl.
CPC .......... *G06F 3/0486* (2013.01); *G06F 3/0482* (2013.01); *G06F 3/0488* (2013.01); *G06F 3/04817* (2013.01); *G06F 3/04842* (2013.01); *G06F 3/04883* (2013.01); *H04M 2250/22* (2013.01); *H04M 2250/52* (2013.01)

(58) Field of Classification Search
CPC .. G06F 3/04817; G06F 3/0488; G06F 9/4443; G06F 3/017; G06F 3/0486; G06F 3/0482
See application file for complete search history.

(56) References Cited

U.S. PATENT DOCUMENTS

| | | | |
|---|---|---|---|
| 8,826,178 B1 * | 9/2014 | Zhang ................... | G06F 1/1694 345/173 |
| 9,111,076 B2 * | 8/2015 | Park ....................... | G06F 3/0412 |
| 2010/0185989 A1 * | 7/2010 | Shiplacoff ............. | G06F 3/0416 715/856 |
| 2010/0299638 A1 | 11/2010 | Choi | |
| 2011/0316797 A1 * | 12/2011 | Johansson ........... | G06F 3/04847 345/173 |
| 2012/0069231 A1 * | 3/2012 | Chao ................... | G06F 3/04883 348/333.01 |
| 2012/0180001 A1 * | 7/2012 | Griffin ................ | G06F 3/04883 715/863 |

(Continued)

FOREIGN PATENT DOCUMENTS

| | | |
|---|---|---|
| EP | 2472377 A2 | 7/2012 |
| EP | 2474894 A1 | 7/2012 |

(Continued)

*Primary Examiner* — Tadesse Hailu
(74) *Attorney, Agent, or Firm* — Birch, Stewart, Kolasch & Birch, LLP

(57) ABSTRACT

A mobile terminal including a body; a camera; a touchscreen provided to the front side of the body and having a plurality of corners; and a controller configured to operate the camera to capture an image upon reception of a first drag input applied to a first corner of the touchscreen and dragged to a center of the touchscreen.

18 Claims, 46 Drawing Sheets

(56) References Cited

U.S. PATENT DOCUMENTS

| | | | |
|---|---|---|---|
| 2014/0211062 A1 | 7/2014 | Kuo et al. | |
| 2014/0218313 A1* | 8/2014 | Zhang | G06F 3/04883 345/173 |
| 2015/0020035 A1* | 1/2015 | Liang | G06F 3/04883 715/863 |
| 2015/0040024 A1* | 2/2015 | Higashibeppu | G06F 3/04883 715/741 |

FOREIGN PATENT DOCUMENTS

| | | |
|---|---|---|
| EP | 2757452 A1 | 7/2014 |
| WO | 2010/040670 A2 | 4/2010 |

\* cited by examiner

MOBILE TERMINAL AND METHOD FOR CONTROLLING THE SAME

CROSS-REFERENCE TO RELATED APPLICATIONS

This application claims priority to Korean Patent Application No. 10-2014-0167706 filed on 27 Nov. 2014 in Korea, the entire contents of which is hereby incorporated by reference in its entirety.

BACKGROUND OF THE DISCLOSURE

1. Field of the Disclosure

The present invention relates to a mobile terminal configured to be used in consideration of user convenience and a method for controlling the same.

2. Background of the Disclosure

Terminals may be generally classified as mobile/portable terminals or stationary terminals. Mobile terminals may also be classified as handheld terminals or vehicle mounted terminals.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

SUMMARY OF THE DISCLOSURE

Accordingly, an object of the present invention is to address the above-noted and other problems.

Another object of the present invention is to provide a mobile terminal configured to enable a user to access a desired function more rapidly by inputting a predetermined touch pattern while a display is turned off, and a method for controlling the same.

Another object of the present invention is to provide a mobile terminal configured to rapidly capture an image at a desired time by automatically operating a camera according to predetermined drag input starting at a corner of a touchscreen while the display unit is turned off, and a method for controlling the same.

To accomplish the aforementioned or other objects of the present invention, a mobile terminal according to one aspect of the present invention includes: a body; a camera; a touchscreen provided to the front side of the body and having a plurality of corners; and a controller configured to operate the camera to capture an image upon reception of first drag input applied to a first corner of the touchscreen and dragged to the center of the touchscreen.

The first drag input may be received while the touchscreen is turned off.

The controller may be configured to operate the camera to capture an image when the first drag input is released.

The first drag input may have a drag path toward the center of the touchscreen and include a plurality of discontinuous drag inputs applied along the drag path, and the controller may be configured to control the image to be captured whenever the first drag input is discontinued.

The controller may be configured to operate a first camera provided to the front side of the body to capture an image in response to the first drag input when the first corner corresponds to an upper corner of the touchscreen and to operate a second camera provided to the backside of the body to capture an image in response to the first drag input when the first corner corresponds to a lower corner of the touchscreen.

When the first drag input is received while a preview image is displayed on the touchscreen according to operation of the camera, the controller may be configured to control the mobile terminal to enter a dual camera mode by activating both a first camera provided to the front side of the body and a second camera provided to the backside of the body.

The controller may be configured to check whether a received notification message is present upon reception of second drag input applied to a second corner of the touchscreen and dragged to the center of the touchscreen and, when the received notification message is present, to display one or more application icons related to the received notification message along a drag path of the second drag input.

The notification message may be a notification message with respect to an application installed in the mobile terminal.

Icon badges corresponding to the notification message may be added to the application icons and displayed.

One of the first corner and the second corner may correspond to one of left and right corners of the touchscreen and the other corresponds to the other of the touchscreen.

The received notification message may include at least one of the number of unread text messages, the number of unanswered calls and application update information.

The controller may be configured to execute a first application corresponding to a point at which the second drag input is released upon release of the second drag input.

When the second drag input is received during execution of the first application, the controller may be configured to execute a second application displayed along the drag path.

When the second drag input is held at a specific point on the drag path for a predetermined time, the controller may be configured to hold display of the one or more application icons.

The controller may be configured to display at least one recently captured image on a window generated in response to the second drag input when the received notification message is not present and to execute a gallery application upon release of the second drag input.

The controller may be configured to display information related to a specific application on the touchscreen upon reception of the first drag input while an execution screen of the specific application is displayed on the touchscreen.

The controller may be configured to display a lock screen corresponding to a lock mode on the touchscreen and, when the first drag input is received while the lock screen is displayed, to set an image captured by operating the camera as a background image of the lock screen.

The controller may be configured to display the set background image as a background image of the lock screen.

When third drag input applied to a third corner of the touchscreen and dragged to the center of the touchscreen is received, the controller may be configured to display one or more application icons along a drag path of the third drag input.

The third corner may correspond to one of a lower left corner and a lower right corner of the touchscreen.

The controller may be configured to sequentially display recently executed applications along a path of the third drag input in response to the third drag input.

A method for controlling a mobile terminal according to another aspect of the present invention includes: receiving first drag input applied to a first corner of a touchscreen having a plurality of corners and dragged to the center of the touchscreen; and operating a camera to capture an image upon release of the first drag input.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE PREFERRED EMBODIMENTS

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
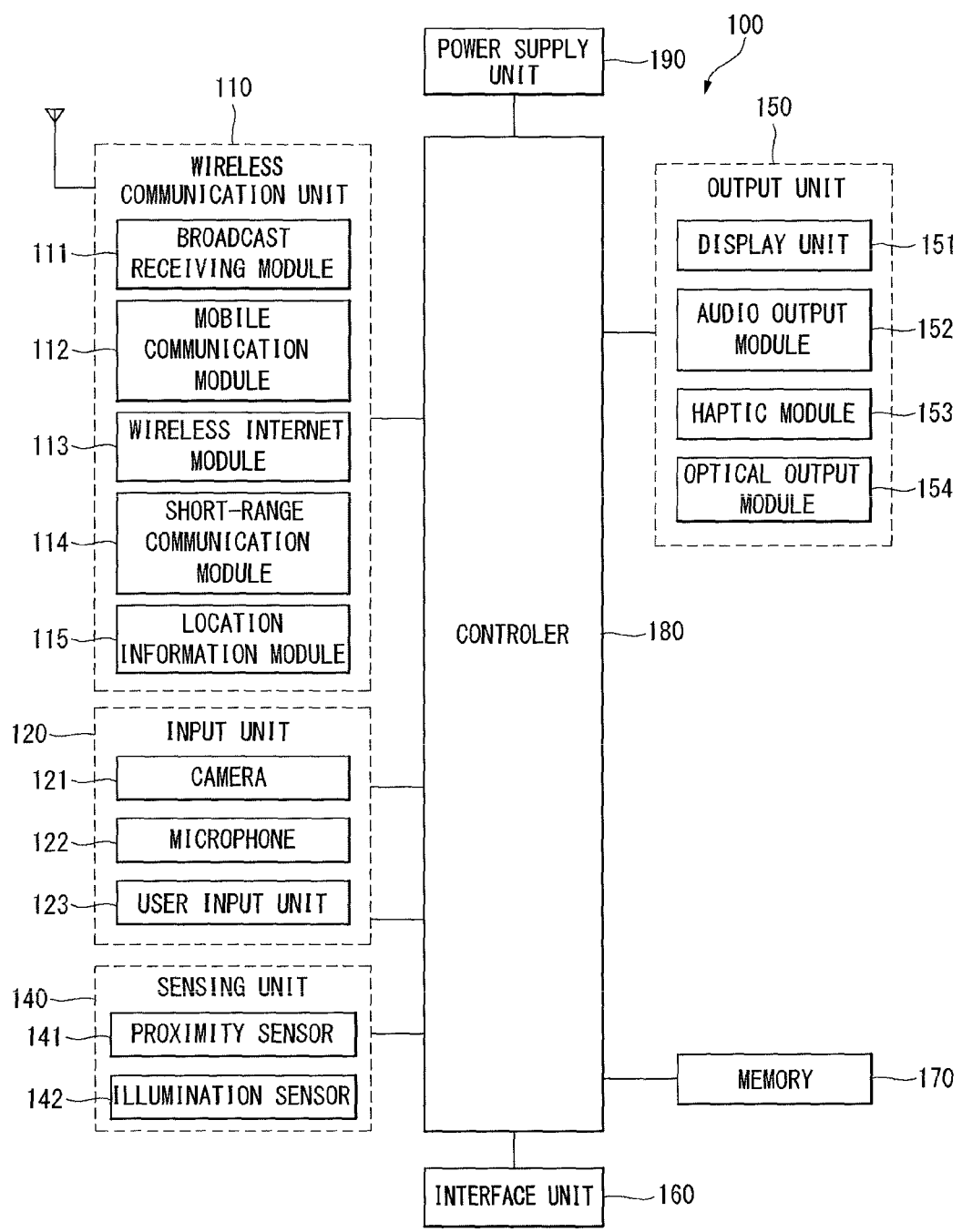
FIG. 1a is a block diagram of a mobile terminal in accordance with the present disclosure.
Figure 1B:
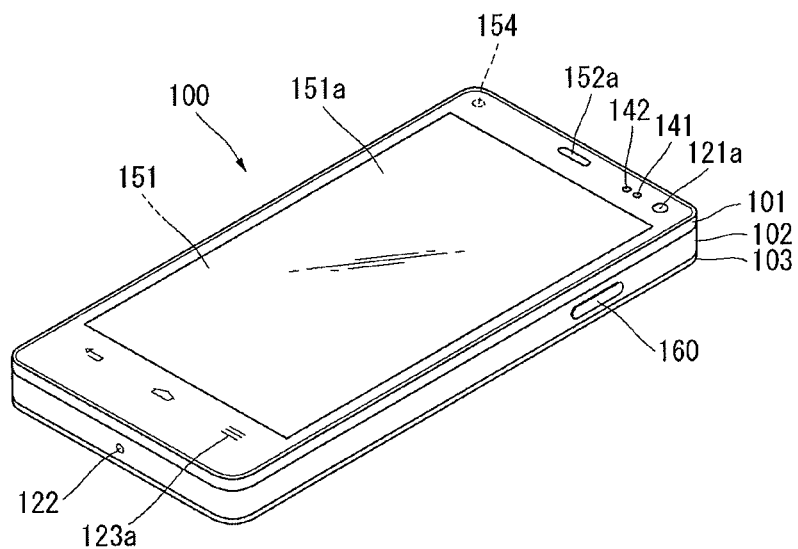
FIGS. 1b and 1c are conceptual views of one example of the mobile terminal, viewed from different directions.
Figure 1C:
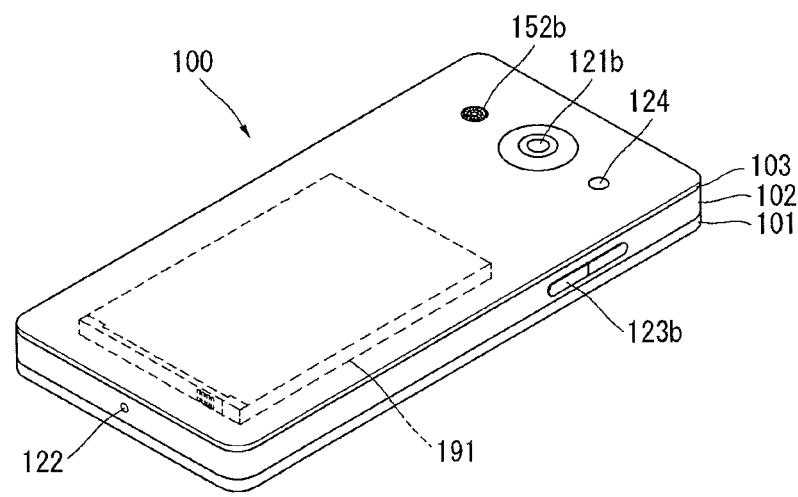

Reference is now made to FIGS. 1a-1c, where FIG. 1a is a block diagram of a mobile terminal in accordance with the present disclosure, and FIGS. 1b and 1c are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1a, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1a, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touchscreen. The touchscreen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1a, or activating application programs stored in the memory 170. As one example, the controller 180 controls some or all of the components illustrated in FIGS. 1a-1c according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1a, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touchscreen through software processing, or a touch key which is located on the mobile terminal at a location that is other than the touchscreen. Further, the virtual key or the visual key may be displayed on the touchscreen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touchscreen, or near the touchscreen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touchscreen is implemented as a capacitance type, the proximity sensor 141 can sense proximity of a pointer relative to the touchscreen by changes of an electromagnetic field, which is responsive to an approach of an object with conductivity. In this instance, the touchscreen (touch sensor) may also be categorized as a proximity sensor.

The term "proximity touch" will often be referred to herein to denote the scenario in which a pointer is positioned to be proximate to the touchscreen without contacting the touchscreen. The term "contact touch" will often be referred to herein to denote the scenario in which a pointer makes physical contact with the touchscreen. For the position corresponding to the proximity touch of the pointer relative to the touchscreen, such position will correspond to a position where the pointer is perpendicular to the touchscreen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touchscreen. In addition, the controller 180 can control the mobile terminal 100 to execute different operations or process different data according to whether a touch with respect to a point on the touchscreen is either a proximity touch or a contact touch.

A touch sensor can sense a touch applied to the touchscreen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touchscreen or a touch key provided in addition to the touchscreen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like. If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touchscreen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information. In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like. The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the mobile terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touchscreen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touchscreen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1*b* and 1*c*, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1b and 1c depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces. The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touchscreen together with the touch sensor. Here, the touchscreen may serve as the user input unit 123 (see FIG. 1a). Therefore, the touchscreen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1b illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123. The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1c, a flash 124 is shown adjacent to the second camera 121b. When an image of a subject is captured with the camera 121b, the flash 124 may illuminate the subject. As shown in FIG. 1c, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touchscreen.

Figure 2:
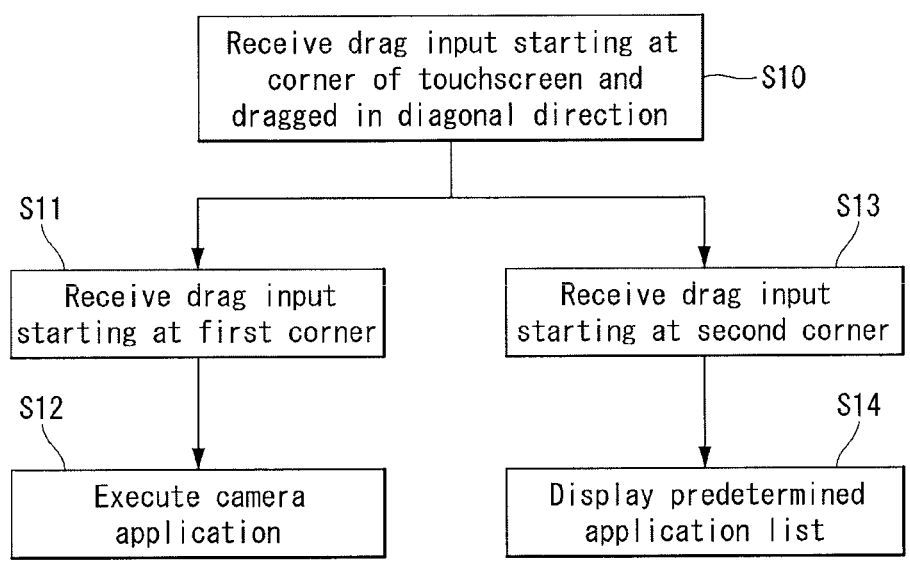
FIG. 2 is a flowchart of a method for controlling a mobile terminal illustrating the concept applied to embodiments of the present disclosure.
Figure 3:
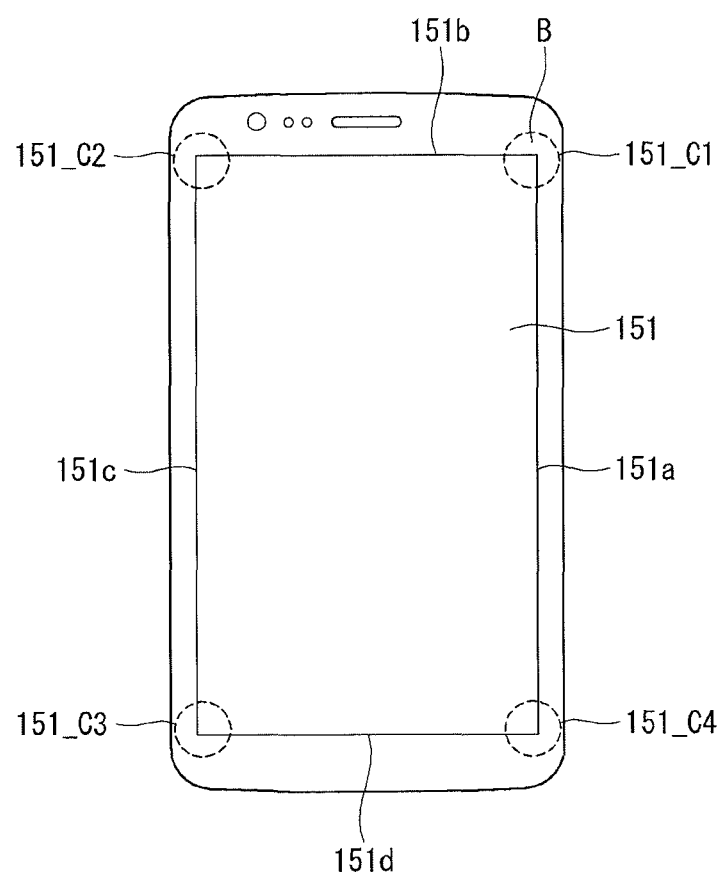
FIG. 3 is a view illustrating corners of a touchscreen applied to embodiments of the present disclosure.

FIG. 2 is a flowchart of a method for controlling a mobile terminal illustrating the concept applied to embodiments of the present invention and FIG. 3 is a view illustrating corners of a touchscreen applied to embodiments of the present invention. The controller 180 of the mobile terminal 100 according to an embodiment of the present invention receives touch input applied from a corner of the touchscreen 151 and dragged to the center of the touchscreen 151 (in a diagonal direction) (S10).

The touch input may be drag input. According to an embodiment of the present invention, different functions may be executed according to corners of the touchscreen 151, at which drag input starts. The controller 180 can receive drag input starting at a first corner of the touchscreen 151 (S11). In this instance, the controller 180 can automatically execute a camera application (S12).

The controller 180 can receive drag input starting at a second corner of the touchscreen 151 (S13). In this instance, the controller 180 can display a predetermined application list on the touchscreen 151 (S14). Here, one of the first corner and the second corner may correspond to one of upper left and right corners of the touchscreen 151 and the other may correspond to the other corner of the touchscreen 151. However, the present invention is not limited thereto. The present invention can include any corner of the touchscreen 151 for the aforementioned operation.

Corners of the touchscreen 151 at which drag input starts will now be described in detail with reference to FIG. 3. Referring to FIG. 3, the touchscreen 151 of the mobile terminal 100 may be provided to the front side of the terminal body. The touchscreen 151 may include a plurality of edges 151a, 151b, 151c and 151d. The first edge 151a may be the right edge of the touchscreen 151, the second edge 151b may be top edge of the touchscreen 151, the third edge 151c may be the left edge of the touchscreen 151 and the fourth edge 151d may be the bottom edge of the touchscreen 151. The edges 151a, 151b, 151c and 151d can form a rectangular shape of the touchscreen 151.

However, the shape of the touchscreen 151, formed by the edges 151a, 151b, 151 c and 151 d, is not limited to the rectangular shape and can be changed in various ways. In the present invention, a point at which two of the edges 151a, 151b, 151c and 151d meet is referred to as a corner. For example, a point at which the first edge 151a and the second edge 151b meet is referred to as a first corner 151_C1. The first corner 151_C1 corresponds to an upper right corner of the touchscreen 151. A point at which the second edge 151b and the third edge 151c meet is referred to as a second corner 151_C2. The second corner 151_C2 corresponds to an upper left corner of the touchscreen 151. A point at which the third edge 151c and the fourth edge 151d meet is referred to as a third corner 151_C3. The third corner 151_C3 corresponds to a lower left corner of the touchscreen 151. A point at which the fourth edge 151d and the first edge 151a meet is referred to as a fourth corner 151_C4. The fourth corner 151_C4 corresponds to a lower right corner of the touchscreen 151.

According to an embodiment of the present invention, each corner may include at least part of a bezel region B in addition to part of the touchscreen 151. That is, when the controller 180 senses touch input applied to the first corner 151_C1, the controller 180 can recognize drag input starting at the bezel region B as drag input starting at the first corner. While a point at which two edges meet is described as a corner in the above description, the corners may correspond to points at 12 o'clock, 3 o'clock, 6 o'clock and 9 o'clock when the display unit of the mobile terminal 100 has a circular shape (e.g., watch-type mobile terminal).

Figure 4:
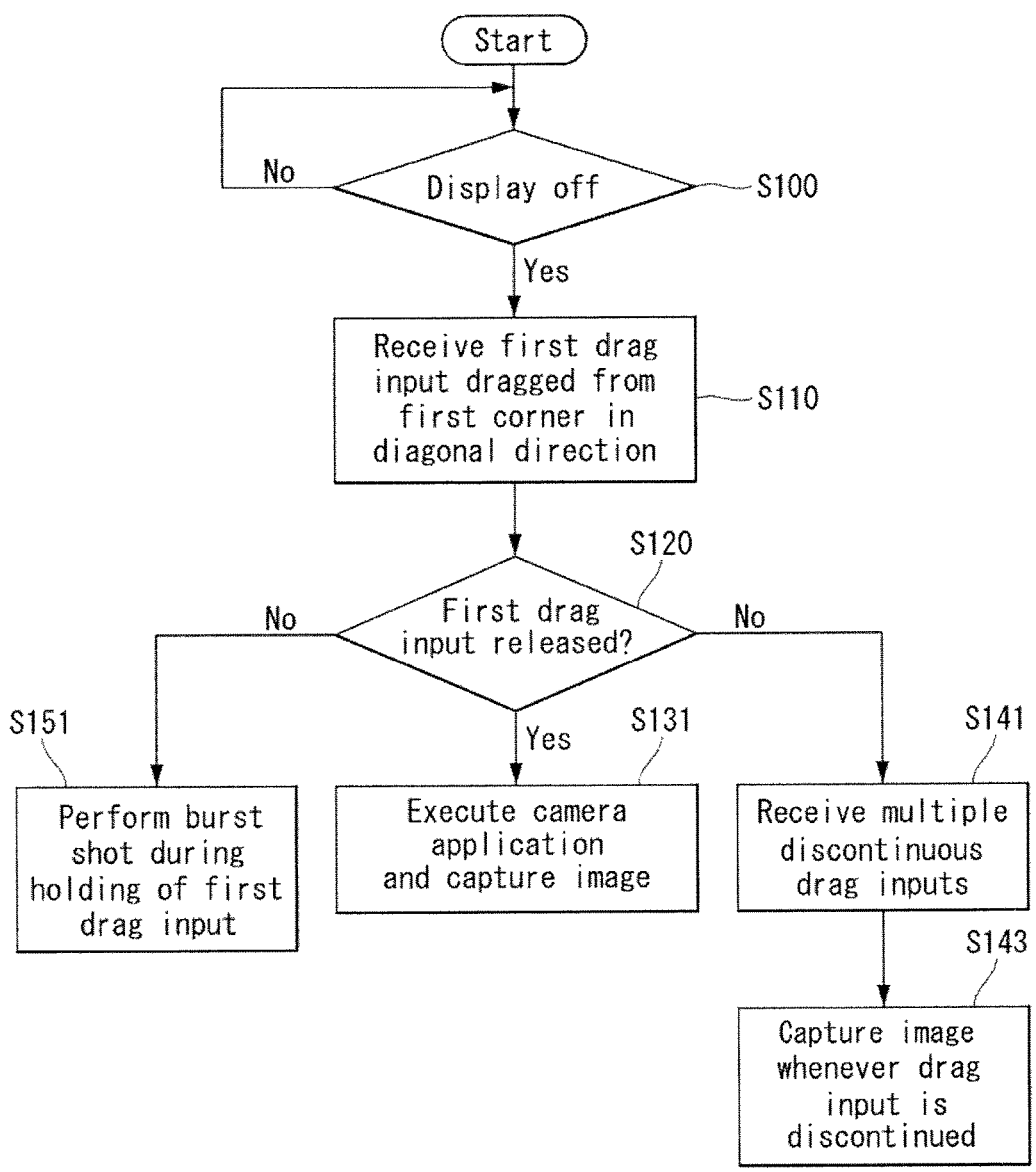
FIG. 4 is a flowchart illustrating a method for controlling a mobile terminal according to a first embodiment of the present disclosure.

FIG. 4 is a flowchart illustrating a method for controlling a mobile terminal according to a first embodiment of the present invention and FIGS. 5 to 14 are views illustrating an example of implementing the method for controlling a mobile terminal according to the first embodiment of the present invention. The method for controlling a mobile terminal according to the first embodiment of the present invention can be implemented in the mobile terminal 100 described with reference to FIGS. 1a to 1c. A description will be given of the method for controlling a mobile terminal according to the first embodiment of the present invention and operations of the mobile terminal 100 to implement the method with reference to the attached drawings.

Referring to FIG. 4, the controller 180 can receive first drag input dragged from the first corner of the touchscreen 151 to the center of the touchscreen 151 (S110) while the display unit is turned off (S100: YES). The state in which the display unit is turned off may be understood as a state in which the mobile terminal 100 is in a lock mode. The lock mode of the mobile terminal 100 may be classified into two modes.

The first lock mode corresponds to when power is not supplied to the touchscreen 151 and thus no information is provided through the touchscreen 151. The second lock mode corresponds to when power is supplied to the touchscreen 151 to enable provision of predetermined information through the touchscreen 151 and the lock mode can be cancelled by manipulation applied to the touchscreen 151 or predetermined manipulation. The first lock mode may be switched to the second lock mode or cancelled according to predetermined manipulation.

In the first embodiment of the present invention, display off state can be based on operation of the mobile terminal 100 in the first lock mode. The present invention can also be applied to when the mobile terminal 100 operates in the aforementioned second lock mode. Examples of such operation will be described in a fourth embodiment (FIGS. 24 to 26C).

Figure 5:
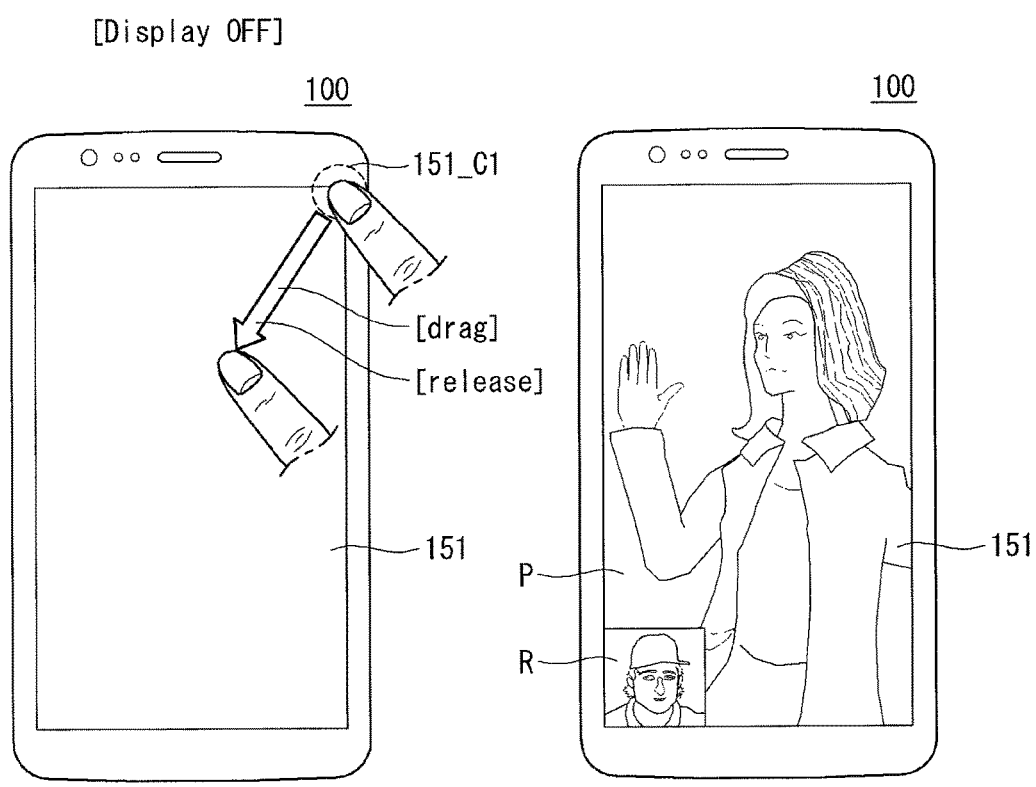
FIGS. 5 to 9, 10a, 10b, 11a, 11b and 12 to 14 are views illustrating an example of implementing the method for controlling a mobile terminal according to the first embodiment of the present disclosure.
Figure 6:
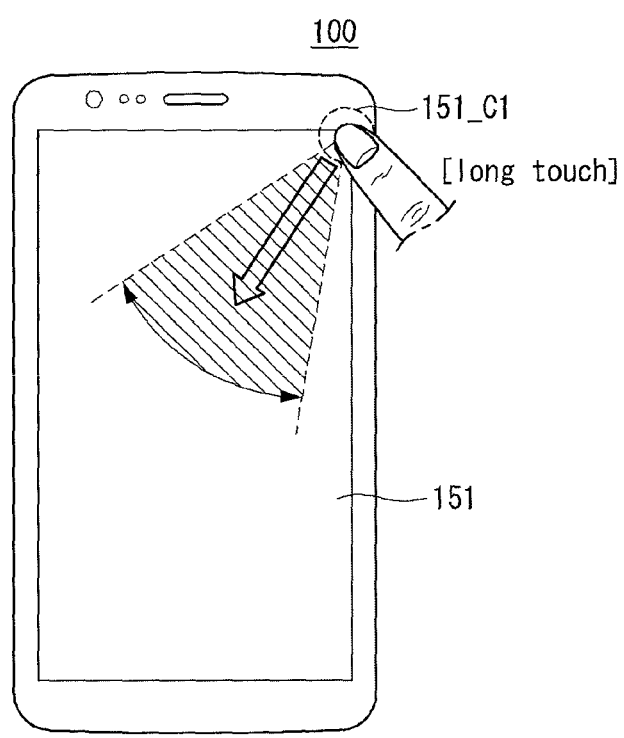

FIGS. 5 and 6 are views illustrating an example of receiving drag input starting at a corner of the display (touchscreen) when the display is turned off. Referring to FIG. 5, the first corner corresponds to the upper right corner of the touchscreen 151 and may include a part of the bezel, as described above. Here, the direction to the center may refer to a direction to the center of the touchscreen 151 from the first corner C1. Accordingly, when the first drag input is dragged in the direction to the center of the touchscreen 151, the first drag input can be dragged to the lower left corner of the touchscreen 151. Here, dragging to the center of the touchscreen 151 does not mean passing the center point of the touchscreen 151. For example, the dragging operation can include operation of touching the first corner and dragging the touch in a diagonal direction within a predetermined range based on the first corner.

Referring to FIG. 6, when the first corner C1 of the touchscreen 15 is touched and then the touch is held for a predetermined time, the controller 180 can display a diagonal direction range within which drag input will be applied to perform an operation according to an embodiment of the present invention. Accordingly, a user can easily perform the operation according to an embodiment of the present invention through the guide for the drag direction.

Referring back to FIG. 4, the controller 180 checks whether the first drag input applied in a predetermined diagonal direction is released at a specific point (S120). The controller 180 can execute a camera application and control the mobile terminal 100 to capture an image when the first drag input is released at a point on the drag path (S131). Here, the controller 180 can control the camera to automatically operate to capture a frontal image when the first drag input is released without additionally selecting a camera application icon while the display unit 151 of the mobile terminal 100 is turned off.

The mobile terminal 100 according to an embodiment of the present invention may include the first camera (121a of FIG. 1b) provided to the front side of the body thereof and the second camera (121b of FIG. 1c) provided to the backside thereof. Accordingly, the second camera 121b can operate to capture a frontal image viewed by the user upon release of the first drag input. The first camera 121a may also be operated according to the first drag input.

The camera operated according to the first drag input may be preset by the user. When the camera operates to capture an image, the controller 180 can control the display unit 151 to be automatically turned on and display the captured image R on the touchscreen 151. According to an embodiment of the present invention, since the camera application is automatically executed according to the first drag input, execution screen of the camera application can be displayed on the touchscreen 151 after the image has been captured. Accordingly, a preview image P obtained through the camera and the image R captured according to the first drag input can be displayed together on the touchscreen 151.

According to an embodiment of the present invention, the first drag input may be applied in various patterns. The controller 180 can set different image capture methods according to first drag input patterns.

Referring back to FIG. 4, the first drag input can have a drag path and include a plurality of discontinuous drag inputs applied on the drag path. The controller 180 can receive a plurality of discontinuous drag inputs (S141). The first drag input may be applied from the first corner (upper right corner) to the third corner (lower left corner). That is, the controller 180 can operate the camera to capture an image once when the first drag input starting at the first corner is ended at the third corner.

Figure 7:
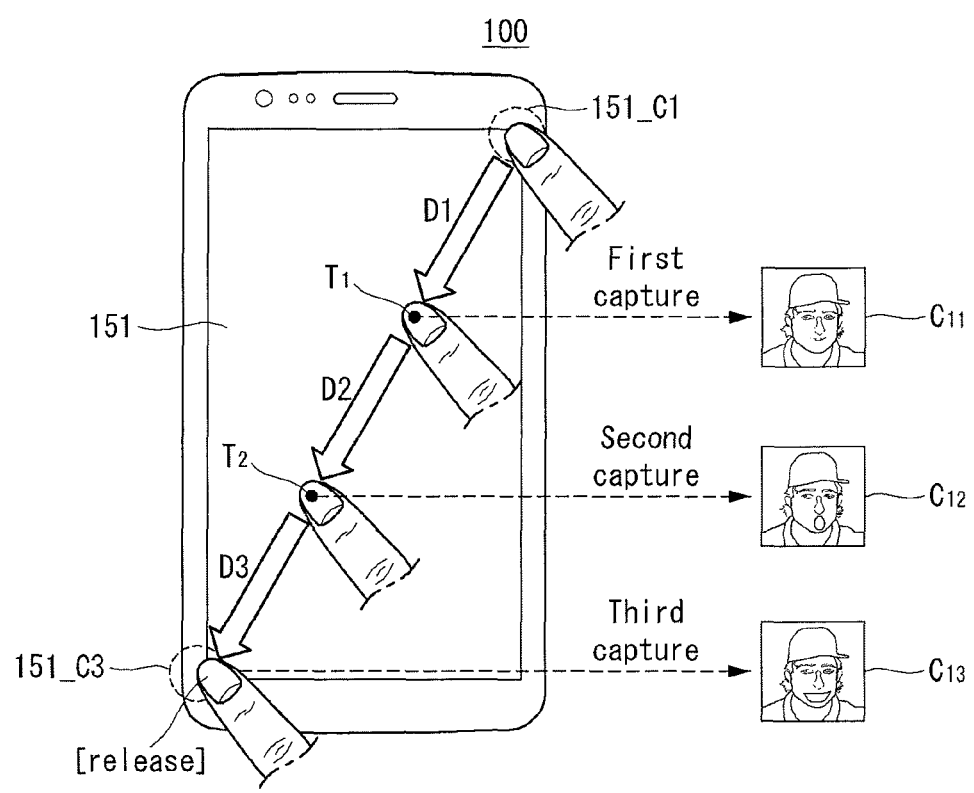

Referring to FIG. 7, however, discontinuous drag inputs D1, D2 and D3 from the first corner C1 to the third corner C3 may be applied. Drag input applied from the first corner to the center of the touchscreen may be temporarily discontinued at a first point T1. The drag may be extended from the first point T1 to the center of the touchscreen, with the touch by a user's finger maintained at the first touch point T1, and temporarily discontinued at a second point T2. In the same manner, the drag may be extended from the second point T2 to the third corner. The drag pattern shown in FIG. 7 is called a plurality of discontinuous drag inputs in the present invention.

Referring back to FIG. 4, the controller 180 can capture an image through the camera whenever drag input starting from the first corner is discontinued while the display unit 151 is turned off (S143). Accordingly, three discontinuous drag inputs are applied in the case of FIG. 7 and thus three images C11, C12 and C13 can be captured.

Figure 8:
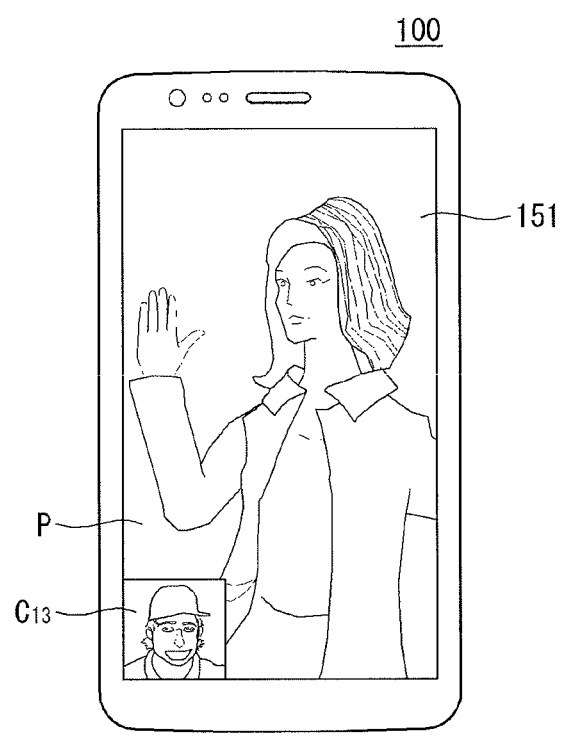
Figure 9:
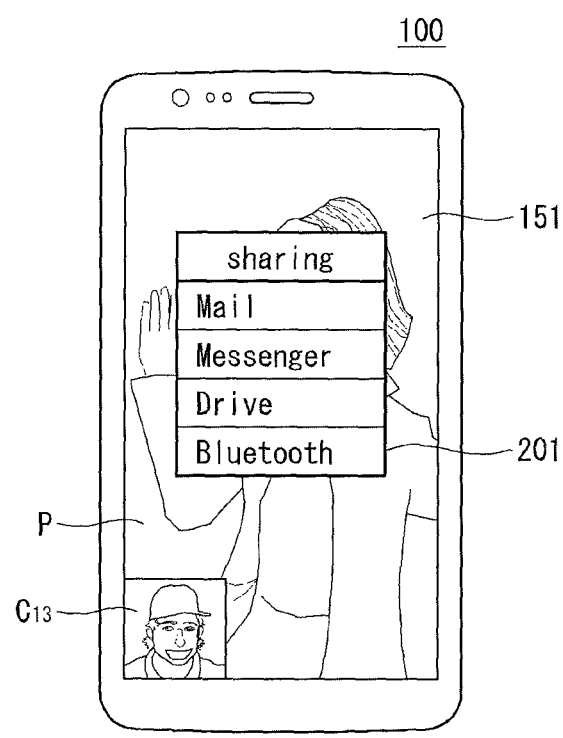

Referring to FIG. 8, upon completion of the plurality of discontinuous drag inputs in a diagonal direction, the controller 180 can display the last image C13 from among the plurality of captured images and a preview image P of the camera on the touchscreen 151. Referring to FIG. 9, according to an embodiment of the present invention, upon reception of input for selecting the captured image C13, one or more sharing applications (mail, messenger, drive and Bluetooth) for sharing the captured image with an external device can be displayed on the touchscreen 151. The controller 180 can transmit the captured image C13 to the external device using an application selected from the one or more sharing applications.

The example of operating the camera using diagonal drag input starting at the first corner while the display unit is turned off according to an embodiment of the present invention may be modified and implemented. For example, the rear camera (121*b* of FIG. 1*c*) can be operated according to drag input starting at the first corner, whereas the front camera (121*a* of FIG. 1*b*) can be operated according diagonal drag input starting at the fourth corner corresponding to the lower right corner of the touchscreen 151.

Figure 10A:
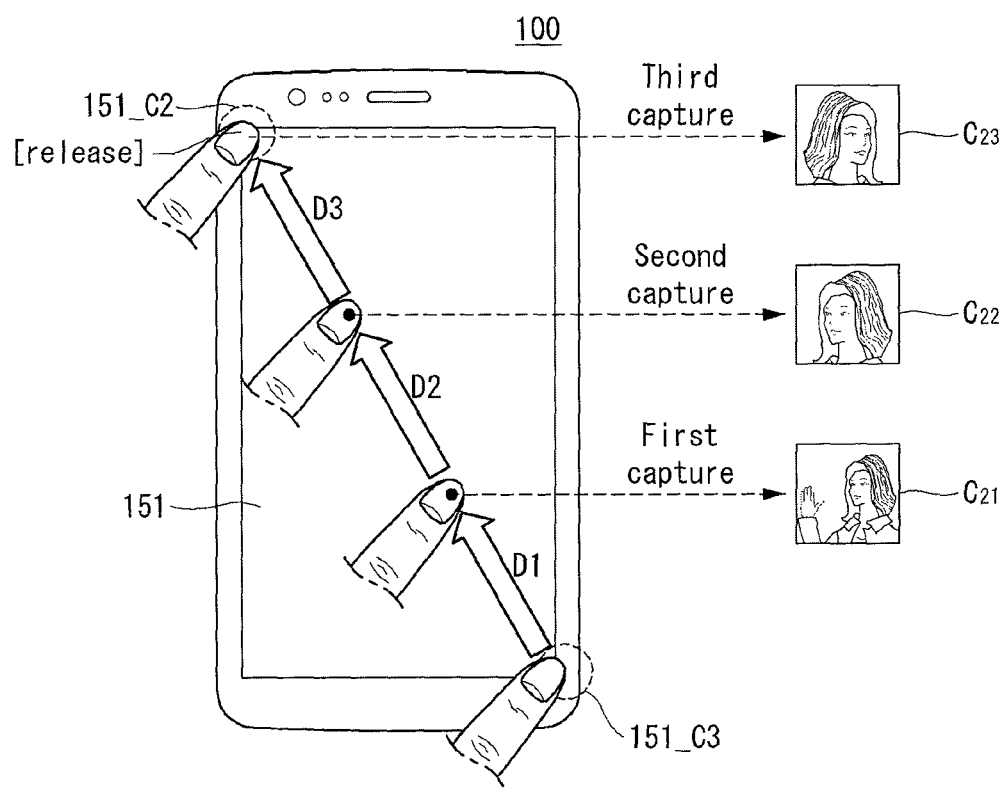
Figure 10B:
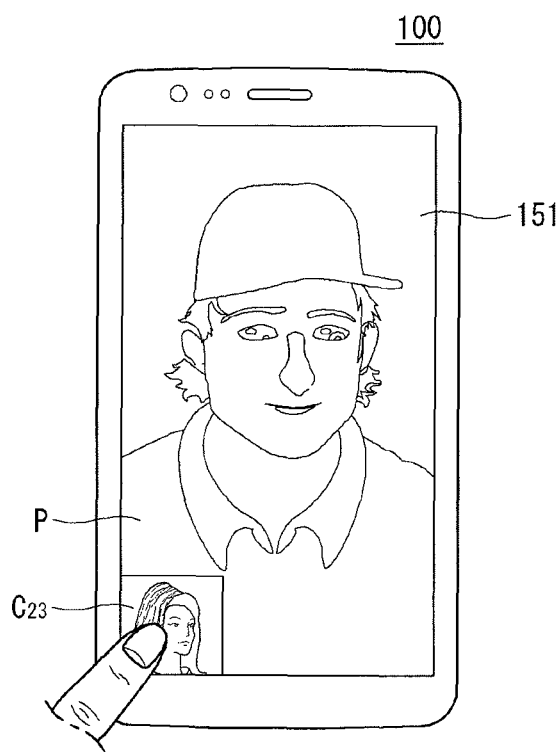

Referring to FIG. 10*a*, the controller 180 can receive drag input starting at the fourth corner C4 and dragged to the center of the touchscreen 151. The controller 180 can capture images C21, C22 and C23 through the front camera (121*a* of FIG. 1*b*) whenever the drag input starting at the fourth corner C4 and dragged in a diagonal direction is discontinued. Referring to FIG. 10*b*, the controller 180 can display the last captured image C23 and a preview image P acquired through the operated camera on the touchscreen 151. According to an embodiment of the present invention, burst shot can be performed through one drag input.

Referring back to FIG. 4, when the first drag input starting at the first corner is held at a point on the drag path for a predetermined time, the controller 180 can perform burst shot during holding of the first drag input (S151). The controller 180 can perform burst shot at a predetermined speed during holding of the first drag input.

Figure 11A:
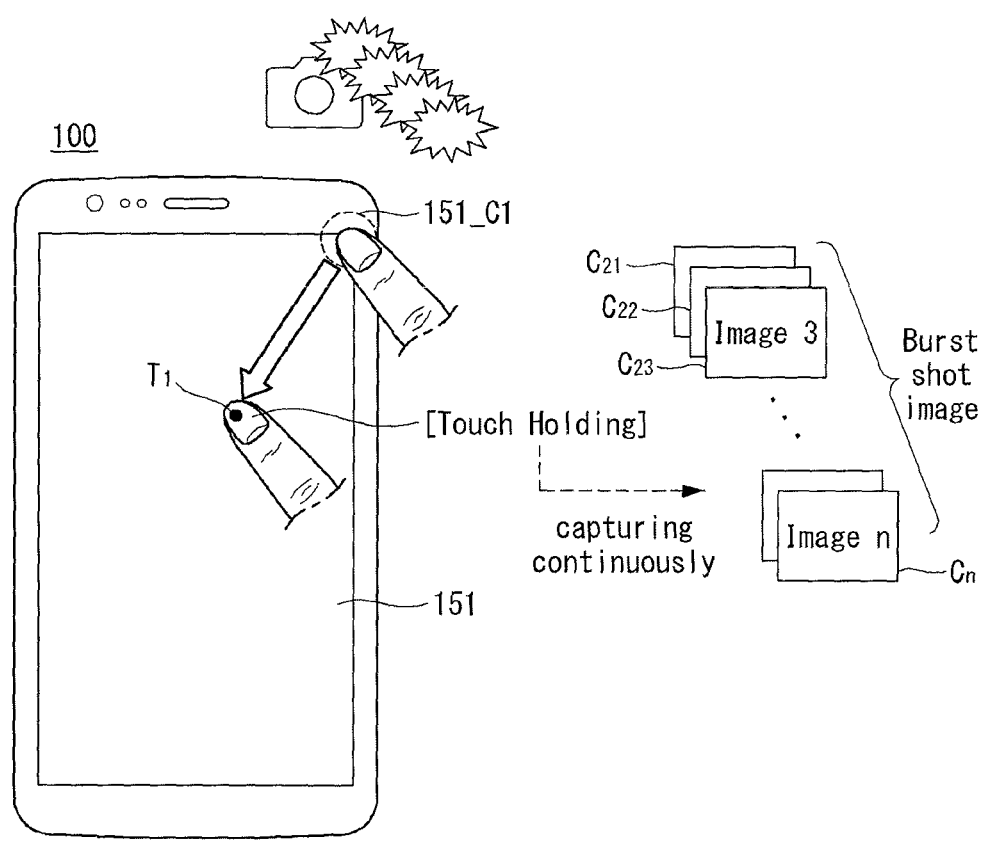
Figure 11B:
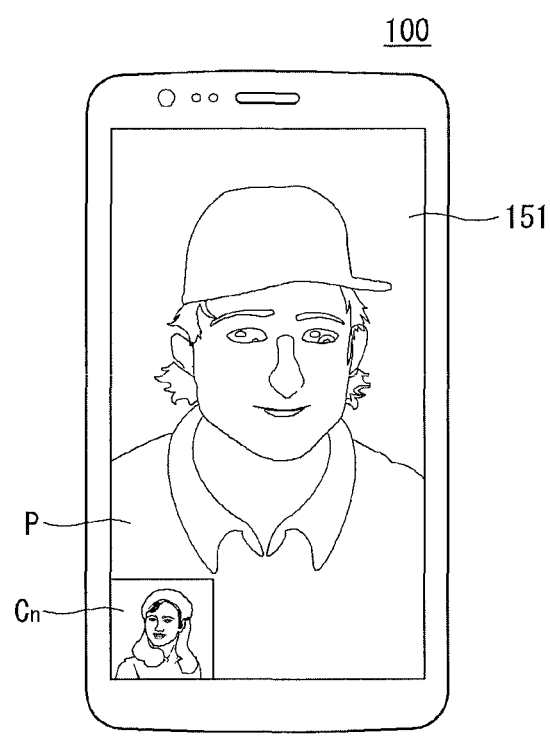

Referring to FIG. 11*a*, the controller 180 can capture images C21, C22, C23, . . . , Cn through the camera when the first drag input dragged from the first corner C1 in a diagonal direction is applied and held at a first point T1 on the drag path. Referring to FIG. 11*b*, the controller 180 can simultaneously display a thumbnail image of the last image Cn from among the images C21, C22, C23, . . . , Cn captured through burst shot and a preview image P on the touchscreen 151.

According to an embodiment of the present invention, it is possible to capture images more rapidly only using diagonal drag input applied to the touchscreen 151 in an emergency even when the display unit is turned off. Furthermore, photographing in various patterns can be performed using different drag input patterns in the emergency. According to an embodiment of the present invention, when the diagonal first drag input starting at the first corner is applied again after execution of the camera application, the camera function for capturing an image can be changed.

Figure 12:
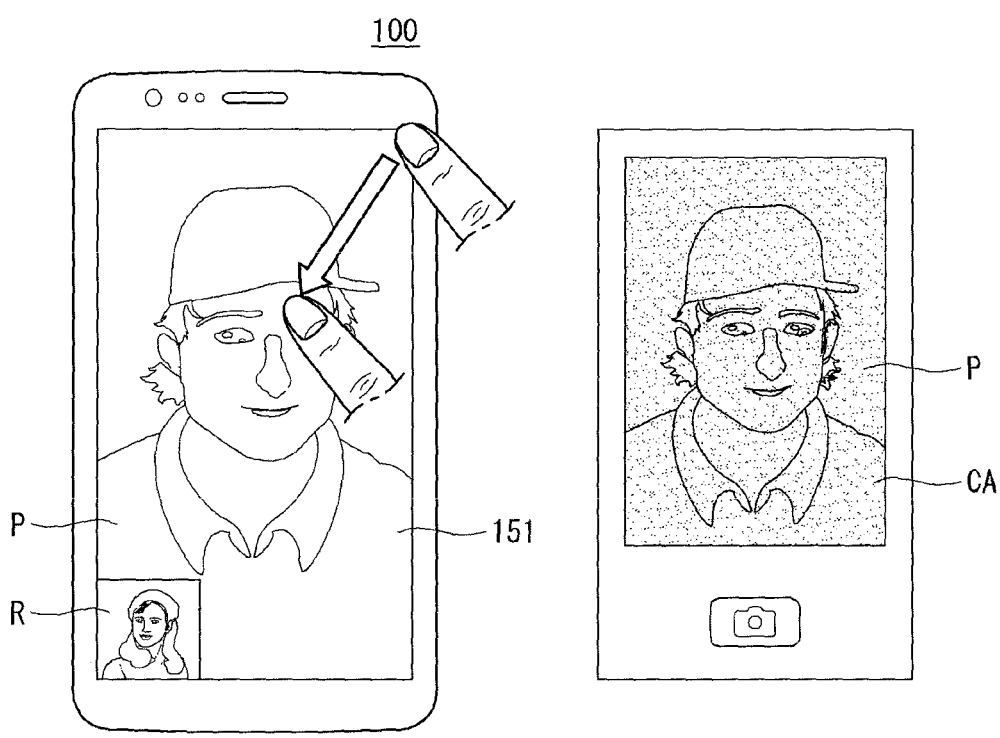

Referring to FIG. 12, when the camera is operated according to the first drag input while the display unit 151 is turned off, the first drag input starting at the first corner can be applied again according to an embodiment of the present invention. That is, when the first drag input is received during execution of a first camera application, the controller 180 can execute a second camera application CA having a different function from the first camera application. The second camera application may be an application that can capture images using a predetermined filtering function.

Figure 13:
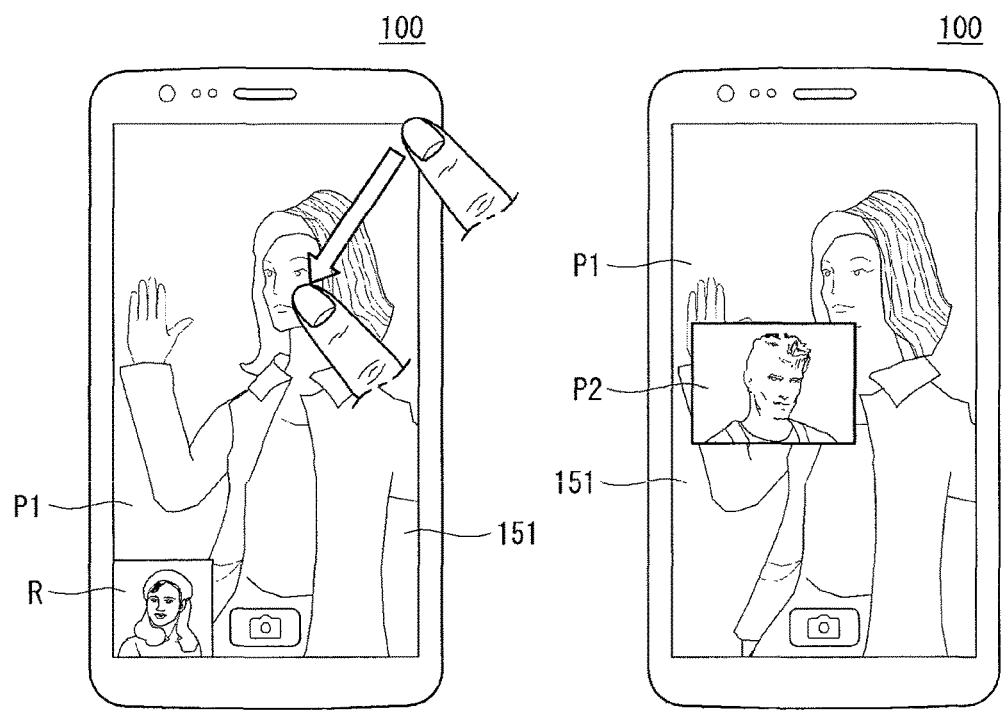

Referring to FIG. 13, upon reception of the diagonal first drag input starting from the first corner during execution of the camera application, the controller 180 can control the camera function of the mobile terminal 100 to be executed in a dual camera mode. In FIG. 13, when the first drag input is received during operation of the rear camera (121*b* of FIG. 1*c*), the front camera (121*a* of FIG. 1*b*) is operated and a preview image P2 captured by the front camera (121*a* of FIG. 1*b*) and a preview image P1 captured by the rear camera (121*b* of FIG. 1*c*) can be simultaneously displayed on the touchscreen 151. That is, it is possible to easily enter the dual camera mode through predetermined drag input even if a predetermined menu button for entering the dual camera mode is not displayed on a preview image according to an embodiment of the present invention.

Figure 14:
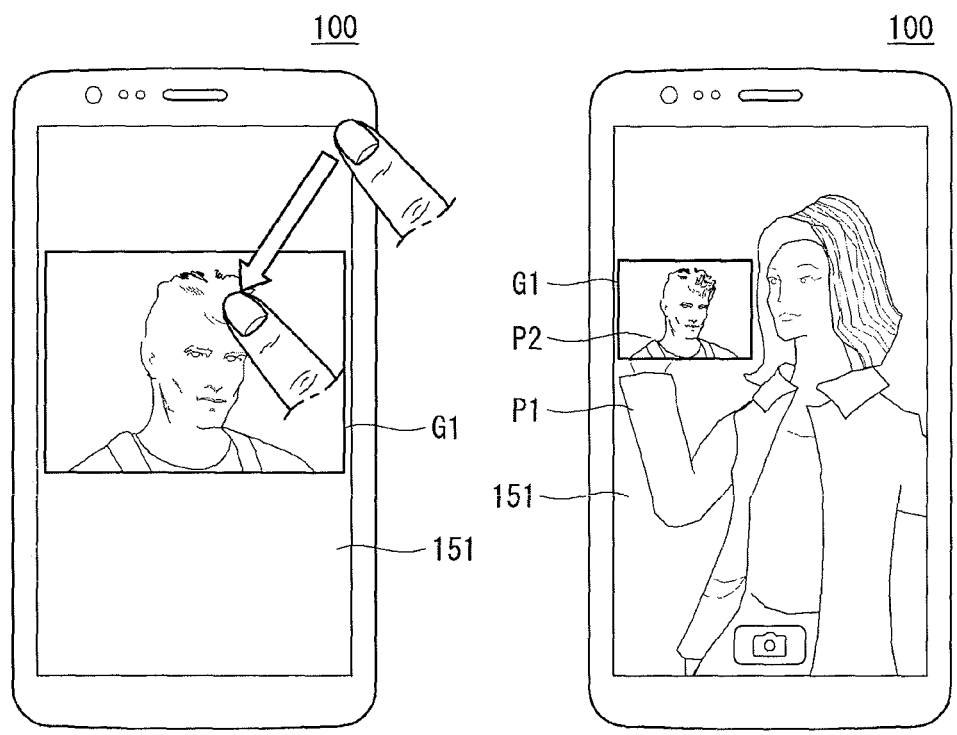

Referring to FIG. 14, the controller 180 can execute the camera application upon reception of the diagonal first drag input starting at the first corner during display of a predetermined image G1 on the touchscreen 151 according to a gallery application. Here, the controller 180 can control the camera application to be executed in the dual mode and control the image G1 of the gallery to be displayed on a screen P2 according to the dual camera mode.

Figure 15:
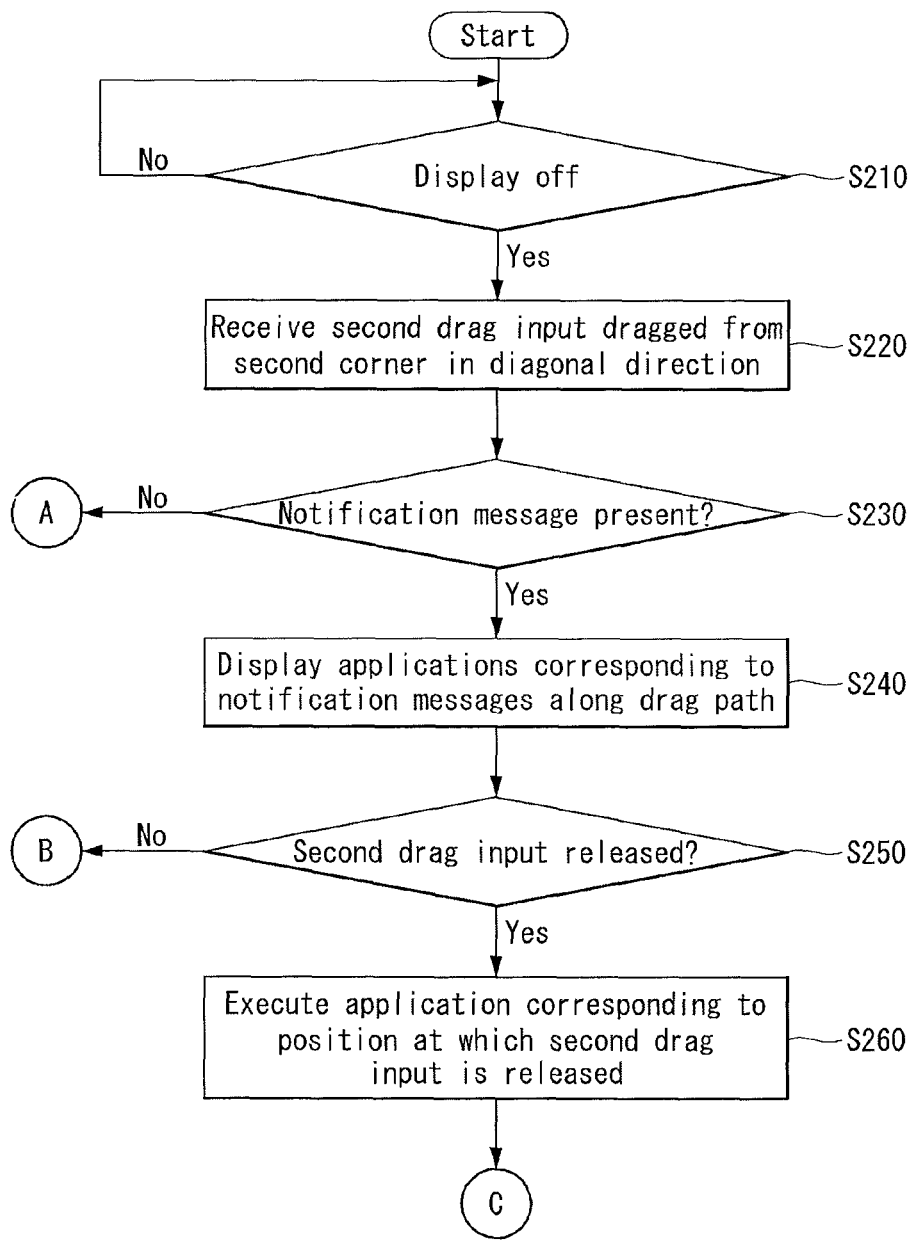
FIG. 15 is a flowchart illustrating a method for controlling a mobile terminal according to a second embodiment of the present disclosure.

FIG. 15 is a flowchart illustrating a method for controlling a mobile terminal according to a second embodiment of the present invention and FIGS. 16A to 19D are views illustrating an example of implementing the method for controlling a mobile terminal according to the second embodiment of the present invention.

The method for controlling a mobile terminal according to the second embodiment of the present invention may be implemented in the mobile terminal 100 described above with reference to FIGS. 1*a* to 1*c*. A description will be given of the method for controlling a mobile terminal according to the second embodiment of the present invention and operations of the mobile terminal 100 to implement the method with reference to the attached drawings. The second embodiment of the present invention may be implemented based on the aforementioned first embodiment. In addition, the second embodiment may be combined with at least part of the first embodiment.

Referring to FIG. 15, the controller 180 can receive diagonal second drag input starting at the second corner (S220) while the display unit 151 of the mobile terminal 100 is turned off (S210). The second corner may correspond to a position on the touchscreen 141, which is different from the aforementioned first corner. For example, when the first corner corresponds to the upper right corner of the touchscreen 151, the second corner may correspond to the upper left corner of the touchscreen 151.

The second drag input may be drag input starting at the second corner and dragged in a diagonal direction. Upon reception of the second drag input, the controller 180 can check whether a received notification message is present (S230). When the notification message is present, the controller 180 can display at least one application corresponding to the notification message on the touchscreen 151 along the drag path of the second drag input upon reception of the second drag input (S240).

Figure 16A:
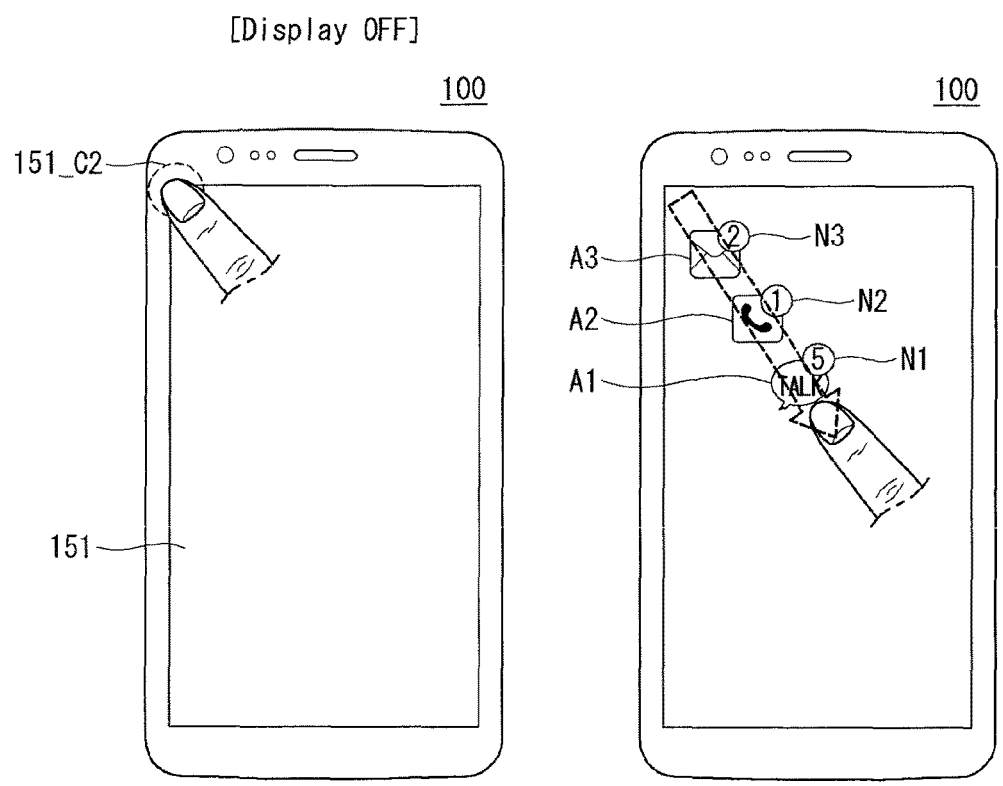
FIGS. 16a to 19d are views illustrating an example of implementing the method for controlling a mobile terminal according to the second embodiment of the present disclosure.

Referring to FIG. 15, the controller 180 checks whether the second drag input is released. When the second drag input is released (S250: YES), the application displayed at a position at which the drag input is released may be executed (S260). Referring to FIG. 16a, upon reception of the diagonal second drag input starting at the second corner C2 corresponding to the upper left corner of the touchscreen 151, the controller 180 can display applications A1, A2 and A3 having notification messages along the path of the second drag input. The applications A1, A2 and A3 can be displayed with icon badges N1, N2 and N3 respectively assigned thereto.

Referring to FIG. 16a, the first application A1 may be a messenger application, the second application A2 may be a call application and the third application A3 may be a message application. The controller 180 can display the first, second and third applications in order of notification message generation. That is, the application corresponding to the finally generated notification message may be the first application A1.

The received notification messages are notification messages with respect to applications installed and executed in the mobile terminal 100 and correspond to data received from external devices for specific applications. The received notification messages may be data that has not been read by a user. For example, the applications installed and executed in the mobile terminal may include a call application, a text message application, a messenger application and the like. A notification message with respect to the call application may be a message indicating presence of an unanswered call. A notification message with respect to the text message application or the messenger application may be an unread text message. A notification message may include update information of a predetermined application.

Icon badges respectively corresponding to the notification messages may be attached to the applications and displayed. The icon badges may be provided in the form of a number indicating the number of pieces of unconfirmed information.

Figure 16B:
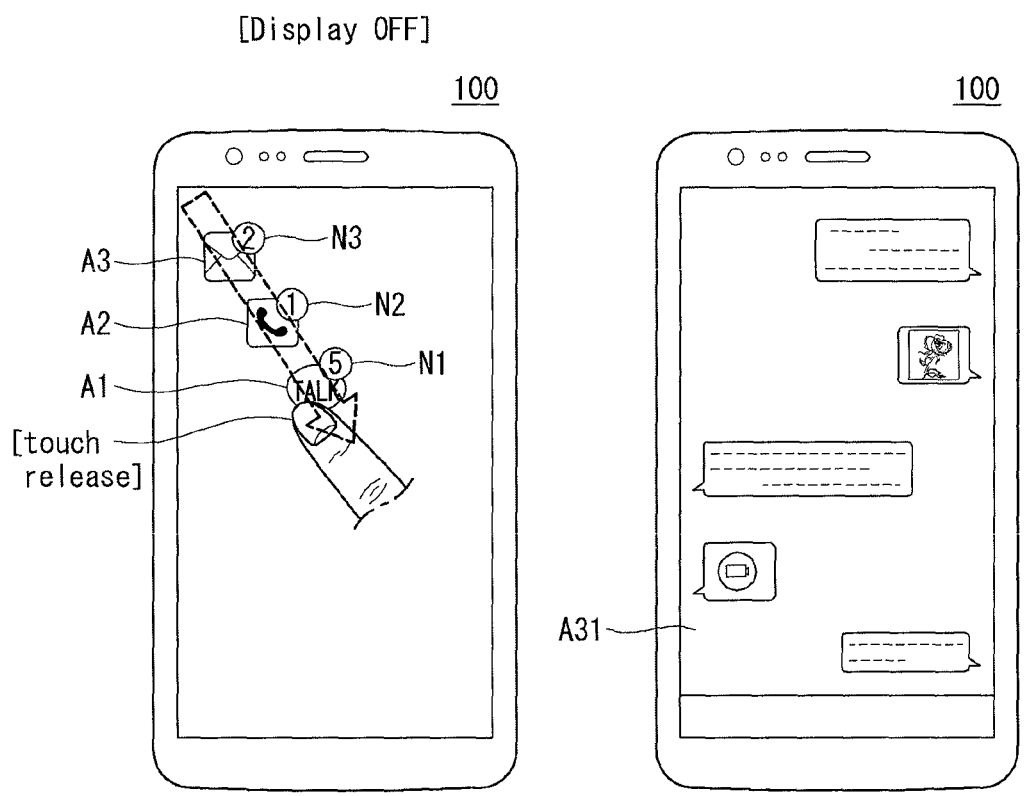

Referring to FIG. 16b, the controller 180 can display an execution screen A11 of the first application A1 on the touchscreen 151 upon release of the second drag input at a point corresponding to the third application A3. Since the first application A1 is the messenger application, the execution screen of the messenger application can be displayed on the touchscreen 151 upon release of the second drag input. That is, it is possible to directly enter the messenger application through predetermined drag input while the display unit is turned off without a process of selecting the messenger application icon to execute the messenger application.

Figure 17:
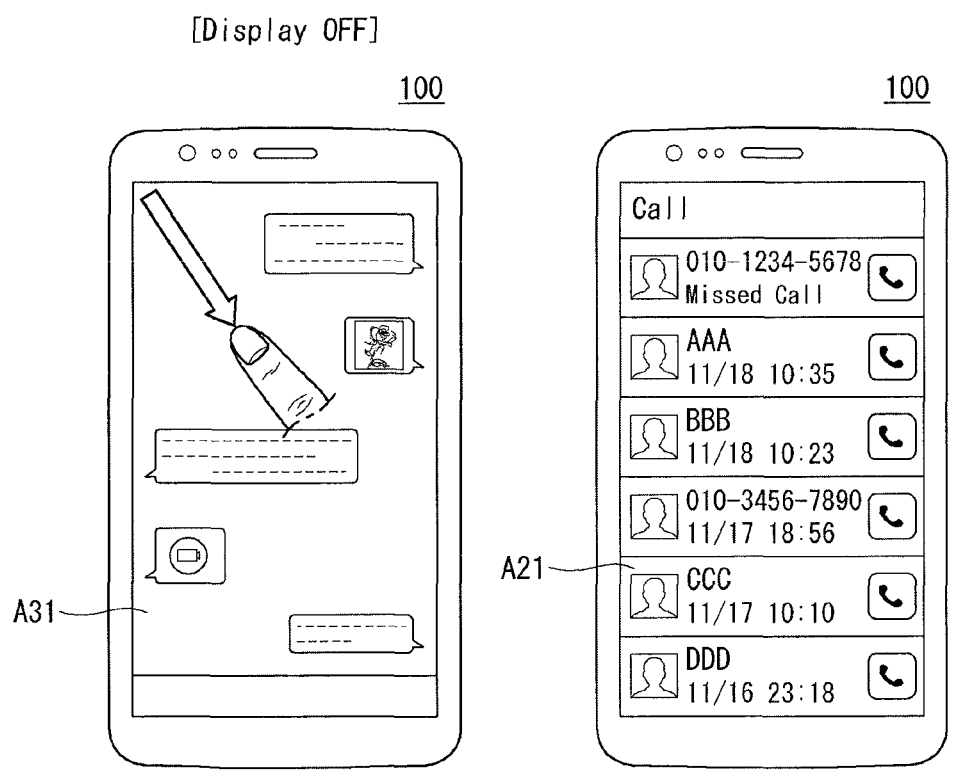

Referring to FIG. 17, when the diagonal second drag input starting at the second corner is received again while the execution screen A11 of the first application (messenger application) is displayed on the touchscreen 151, the controller 180 can execute the second application A2 corresponding to the notification message generated immediately before the notification message corresponding to the first application A1 and display an execution screen A21 of the second application A2. Here, the second application may be a call application.

Figure 18A:
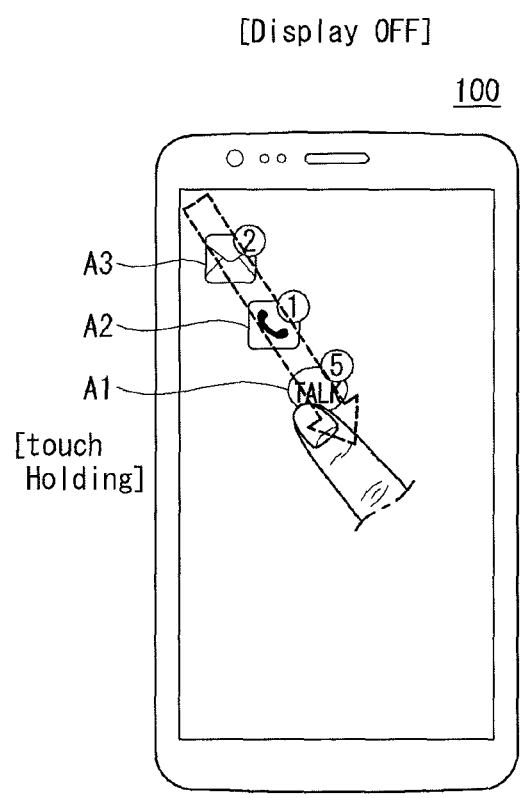
Figure 18B:
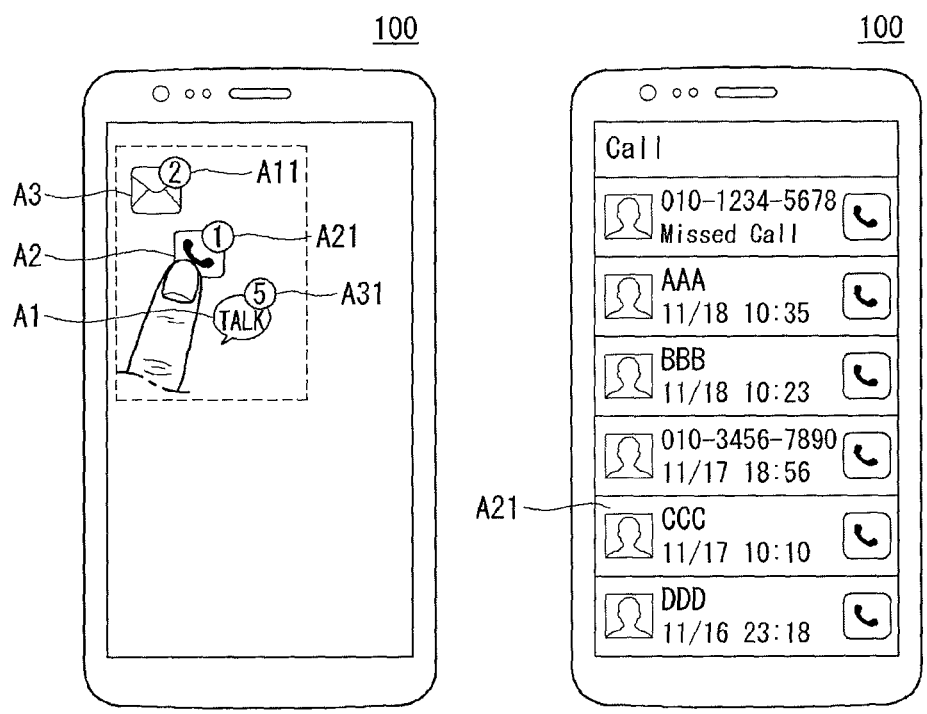

Referring to FIG. 18a, the controller 180 can maintain display of the first, second and third applications A1, A2 and A3 displayed in response to the second drag input when the second drag input is held at the position corresponding to the first application A1 for a predetermined time. Referring to FIG. 18b, upon reception of input for selecting the second application A2 from the displayed first, second and third applications A1, A2 and A3, the execution screen A21 of the second application A2 can be displayed on the touchscreen 151.

That is, according to an embodiment of the present invention, applications corresponding to generated notifications can be sequentially displayed on the touchscreen 151 upon reception of the second drag input starting at the second corner while the display unit is turned off.

Figure 19A:
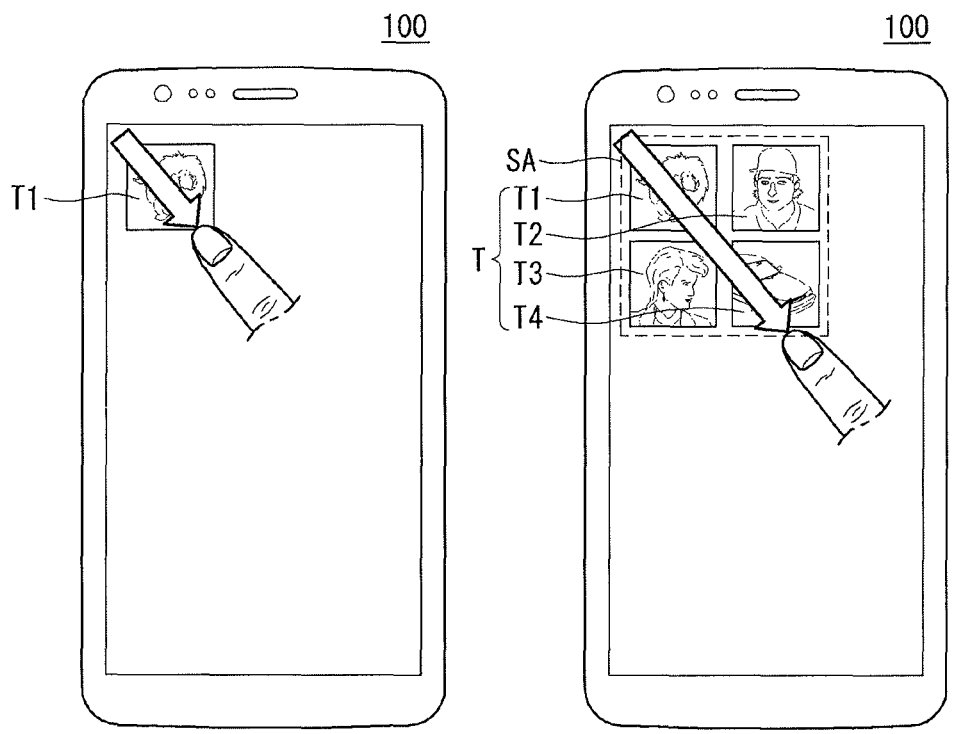

Referring back to FIG. 15, when no notification message is present although the second drag input has been received (S230: No), the controller 180 can display recently captured images T1, T2, T3 and T4 in a virtual area SA generated according to the second drag input, as shown in FIG. 19a. The size of the virtual area SA increases as the length of the second drag input increases, and the increased virtual area SA can display more images.

Figure 19B:
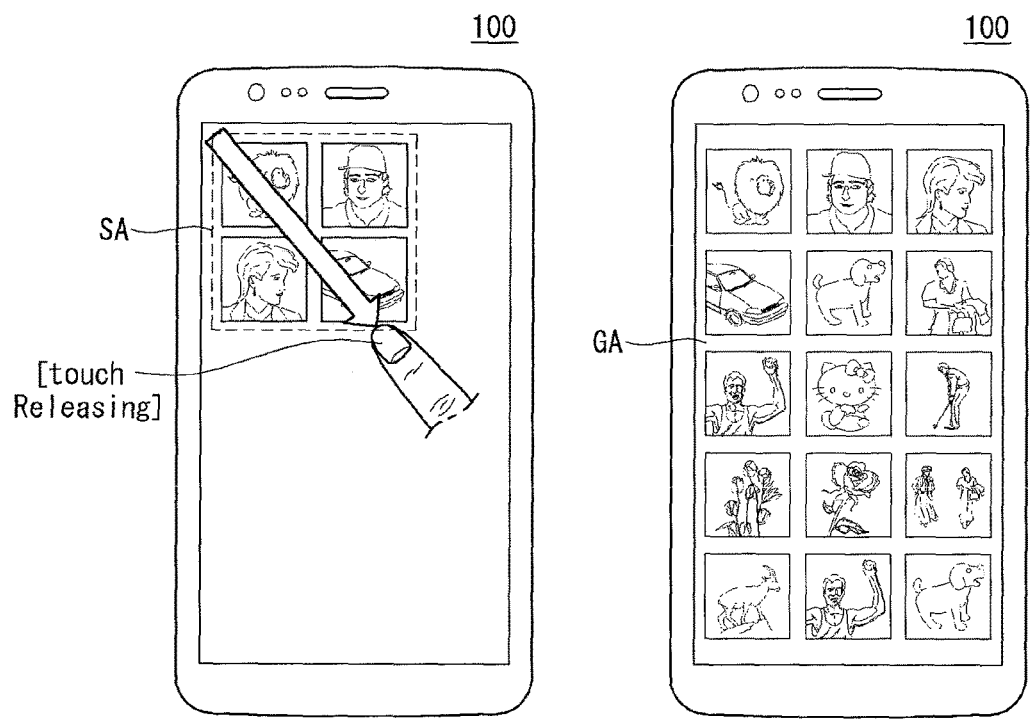
Figure 19C:
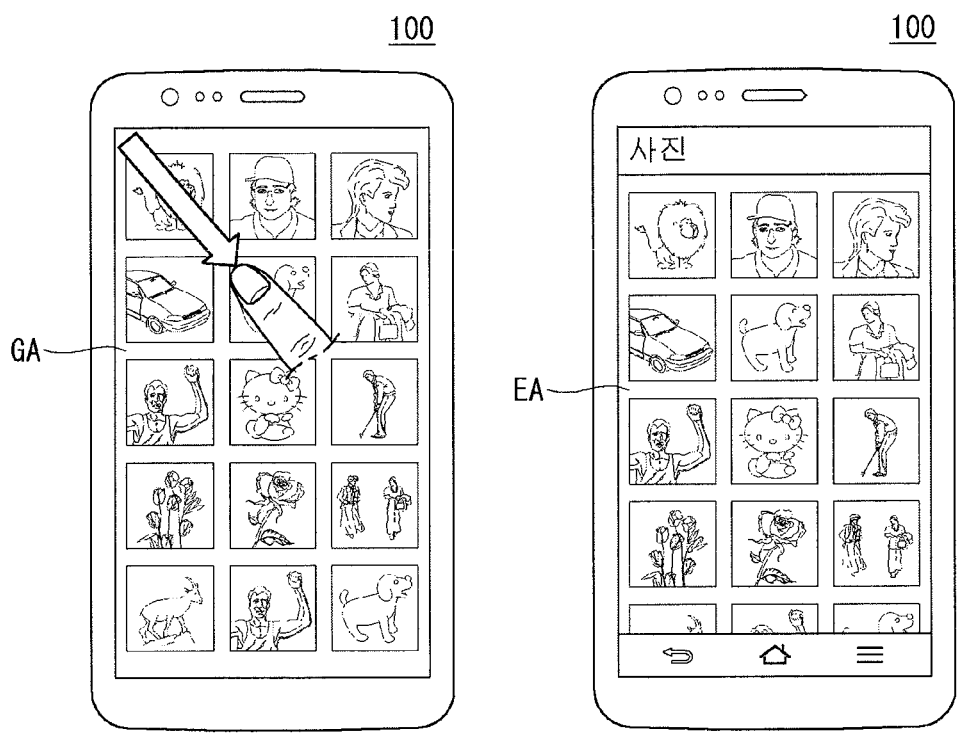

Referring to FIG. 19b, when the second drag input is released while the virtual area SA is displayed, a gallery application GA can be executed and thus previously captured and stored images can be displayed on the touchscreen 151. Referring to FIG. 19c, when the second drag input starting at the second corner is applied again while the execution screen of the gallery application GA is displayed on the touchscreen 151, the controller 180 can execute an image editing application EA in addition to the gallery application GA.

Figure 19D:
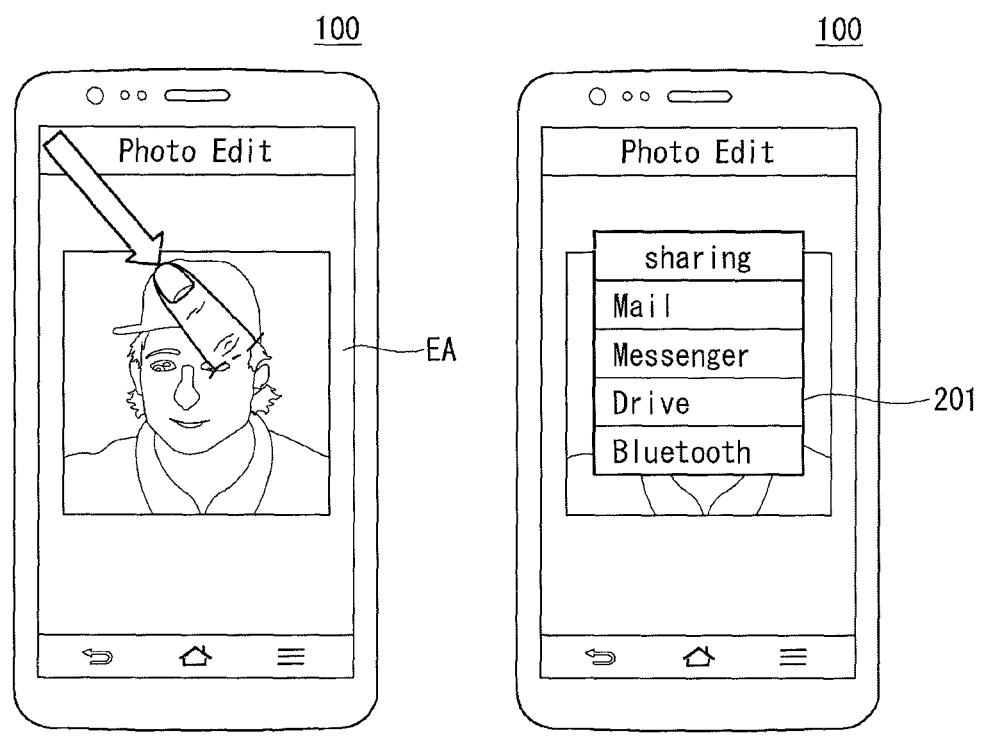

Referring to FIG. 19d, when the second drag input starting at the second corner is applied again while a predetermined image is edited through the image editing application EA, the controller 180 can display a list 201 of sharing applications for sharing the edited image on the touchscreen 151.

As described above, according to an embodiment of the present invention, execution of an application can be controlled upon reception of the second drag input starting at the second corner of the touchscreen 151. That is, it is possible to easily enter applications having predetermined depths through diagonal drag inputs having the same pattern.

Figure 20:
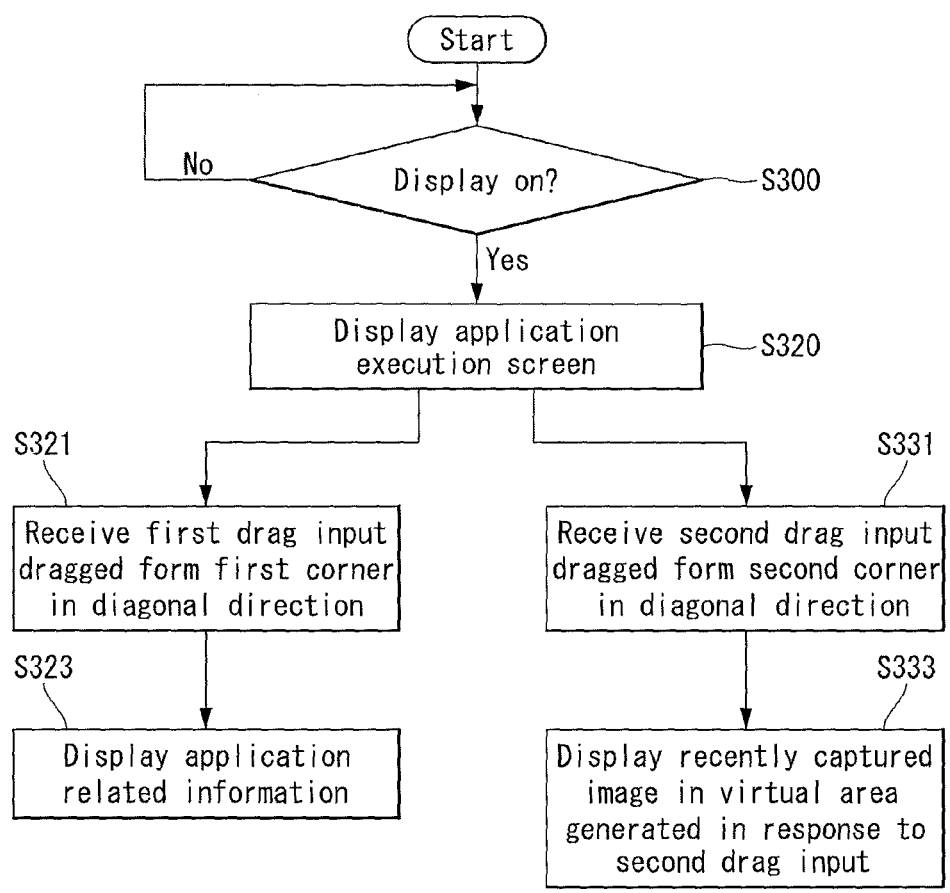
FIG. 20 is a flowchart illustrating a method for controlling a mobile terminal according to a third embodiment of the present disclosure.

FIG. 20 is a flowchart illustrating a method for controlling a mobile terminal according to a third embodiment of the present invention and FIGS. 21A to 23B are views illustrating an example of implementing the method for controlling a mobile terminal according to the third embodiment of the present invention.

The method for controlling a mobile terminal according to the third embodiment of the present invention may be implemented in the mobile terminal 100 described above with reference to FIGS. 1a to 1c. A description will be given of the method for controlling a mobile terminal according to the third embodiment of the present invention and operations of the mobile terminal 100 to implement the method with reference to the attached drawings. The third embodiment of the present invention may be implemented based on the aforementioned first and second embodiments. In addition, the third embodiment may be combined with at least part of the first or second embodiment.

Referring to FIG. 20, the third embodiment may be implemented while the display unit is turned on. The controller 180 can display an execution screen of a predetermined application on the touchscreen 151 (S310) while the display unit is turned on (S300).

In the third embodiment of the present invention, the first drag input starting at the first corner or the second drag input starting at the second corner can be received during execution of the predetermined application. The controller 180 can execute different functions according to the first drag input and the second drag input. For example, the controller 180 can receive the first drag input starting at the first corner and applied in a diagonal direction (S321). The controller 180 can display information related to the executed application (S323).

Figure 21A:
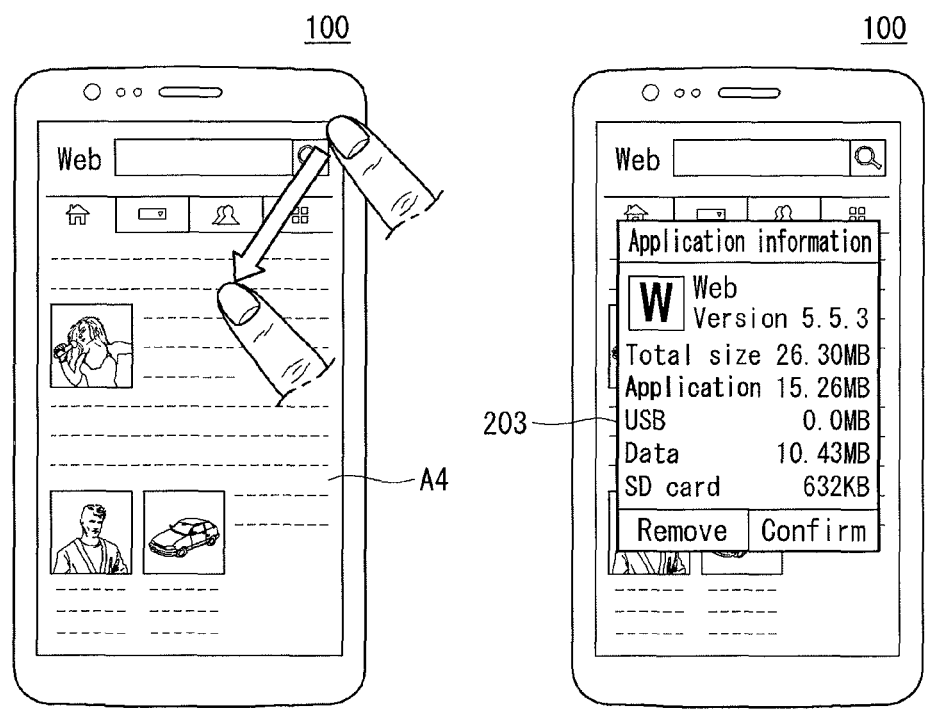
FIGS. 21a to 23b are views illustrating an example of implementing the method for controlling a mobile terminal according to the third embodiment of the present disclosure.
Figure 21B:
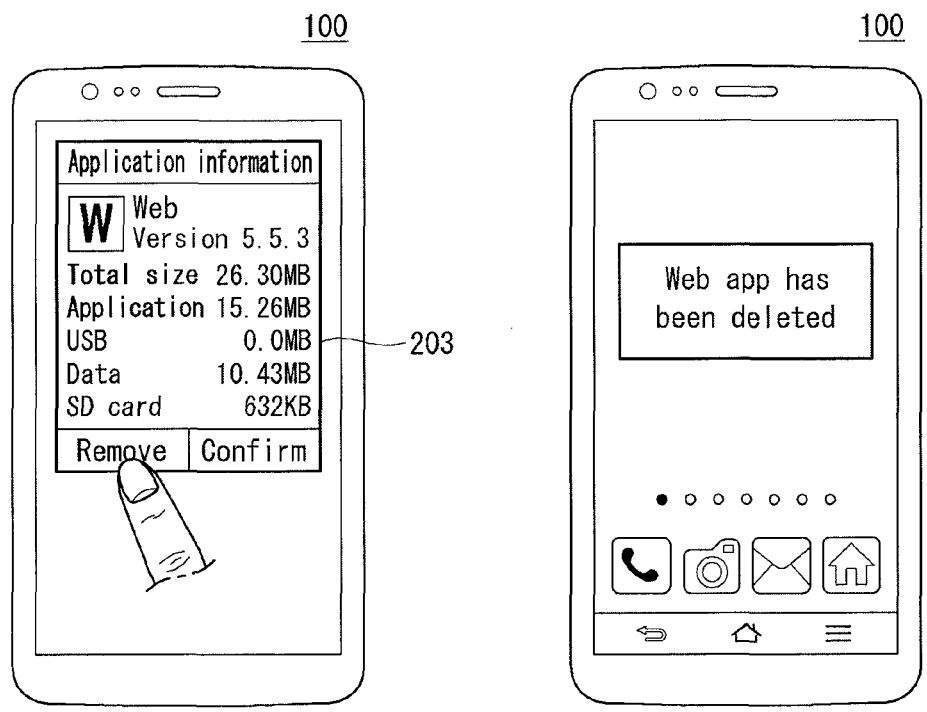

Referring to FIGS. 21a and 21b, when the first drag input starting from the first corner and applied in a diagonal direction is received while a webpage A4 is displayed on the touchscreen 151, information 203 related to the webpage can be displayed on the touchscreen 151. The information 203 related to the webpage may include data capacity of a web application corresponding to the webpage, a menu for deleting the web application and the like. Referring to FIG. 21B, the controller 180 can delete the web application from the mobile terminal 100 upon selection of the menu.

Referring back to FIG. 20, the second drag input starting at the second corner may be received while the application execution screen is displayed (S331). The controller 180 can display a most recently captured image in a virtual area generated according to the second drag input (S333).

Figure 22A:
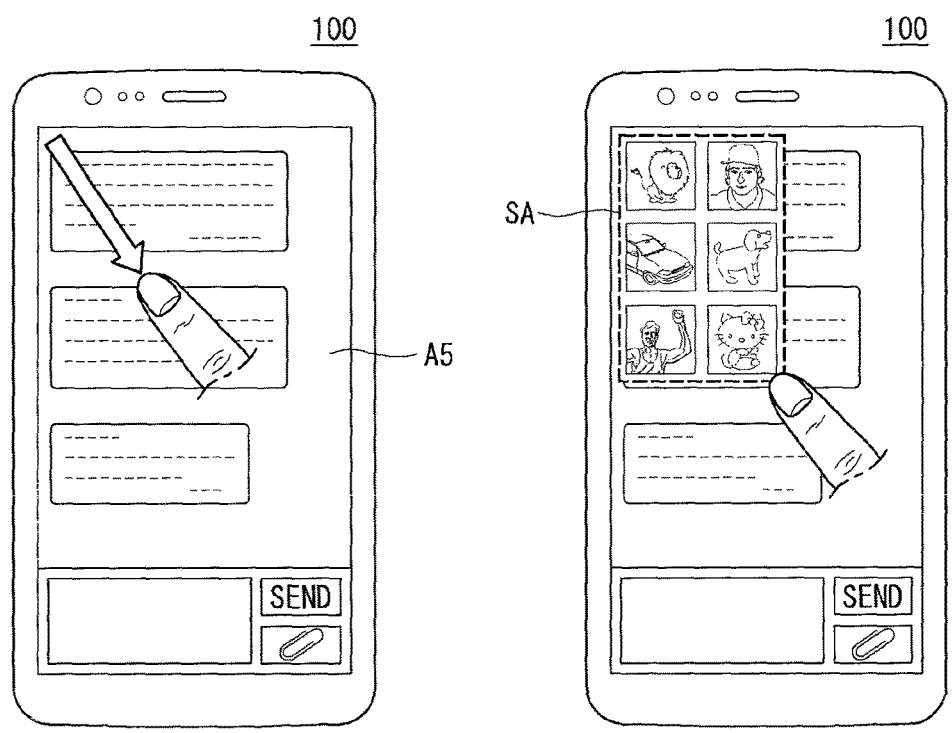

Referring to FIG. 22a, the controller 180 receives the second drag input starting at the second corner and applied in a diagonal direction while an application execution screen A5 is displayed on the touchscreen 151. The controller 180 generates a virtual area SA and displays the virtual area SA on the touchscreen 151 in response to the second drag input. The size of the virtual area SA can be changed according to the length of the second drag input. The controller 180 can display images stored in a gallery in the generated virtual area SA. The aforementioned application may be a messenger application.

Figure 22B:
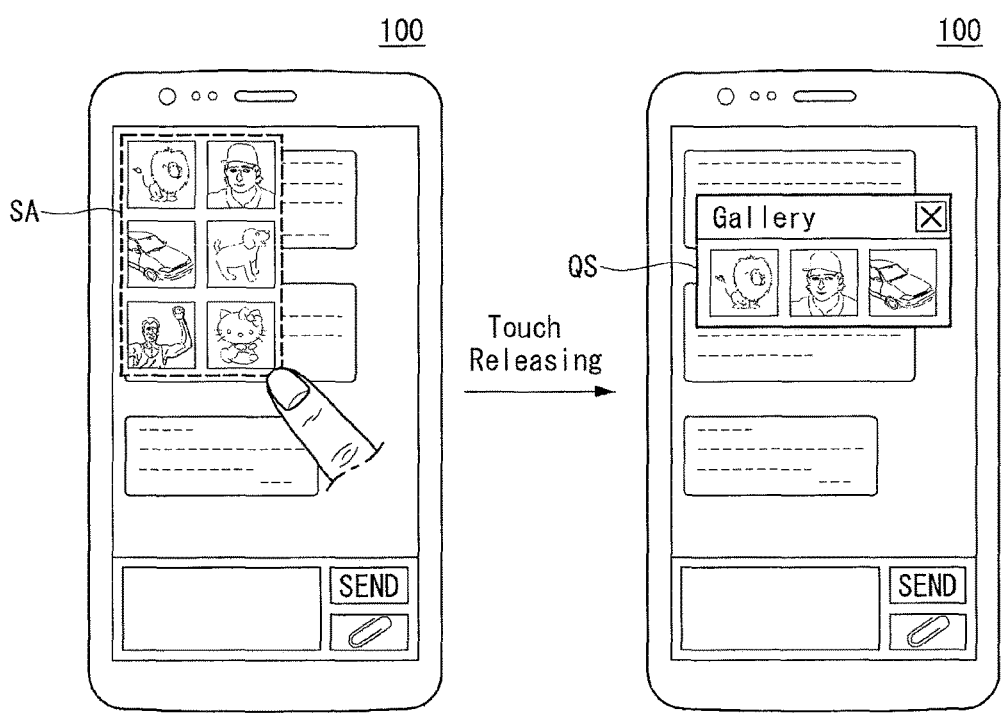

Referring to FIG. 22b, the controller 180 can set the virtual area SA as a floating window QS of the gallery application and display images stored in the gallery on the floating window QS upon release of the second drag input after display of the virtual area SA. The floating window QS may be displayed on a previously executed application in an overlapping manner and the position of the floating window QS may be changed by a user.

Figure 22C:
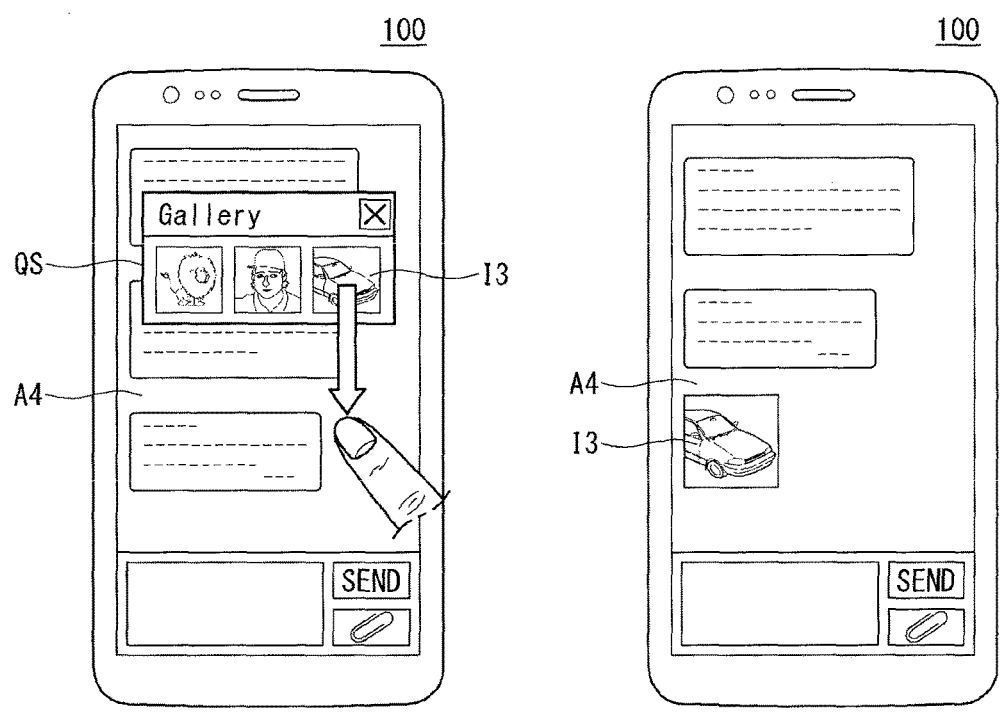
Figure 22D:
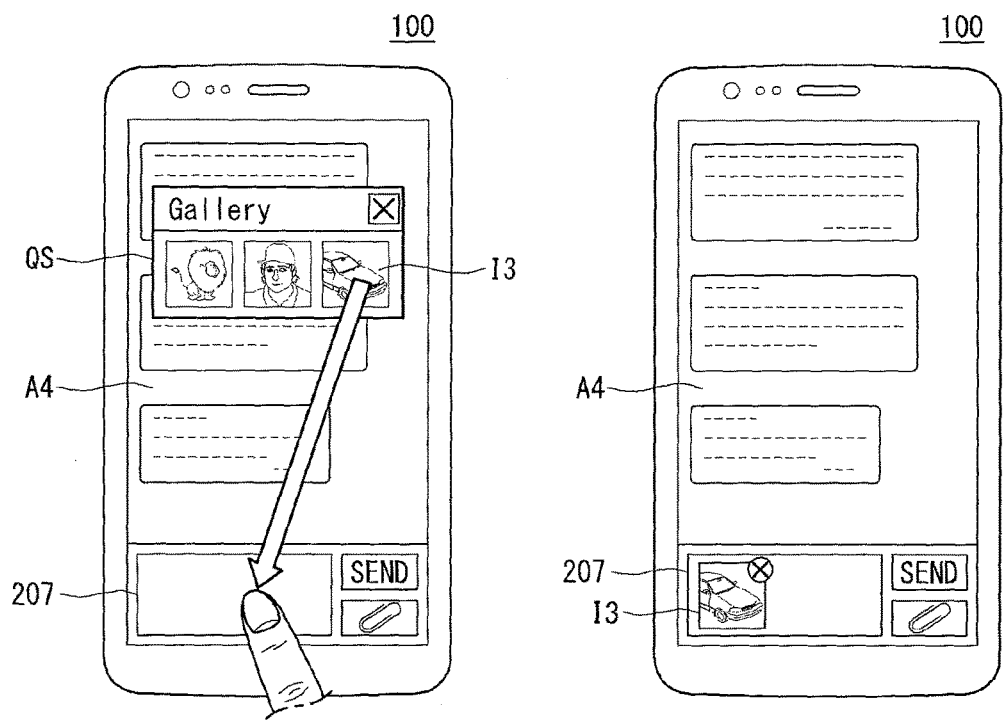

Referring to FIG. 22c, upon reception of input of dragging a specific image 13 displayed on the floating window QS to an execution screen A4 of the messenger application, the controller 180 can directly send the specific image 13 to a corresponding messenger counterpart. Referring to FIG. 22d, the messenger application execution screen may include a message input window 207. The controller 180 can attach the specific image 13 included in the floating window QS to the message input window 207 upon reception of input of dragging the specific image 13 to the message input window 207.

Figure 23A:
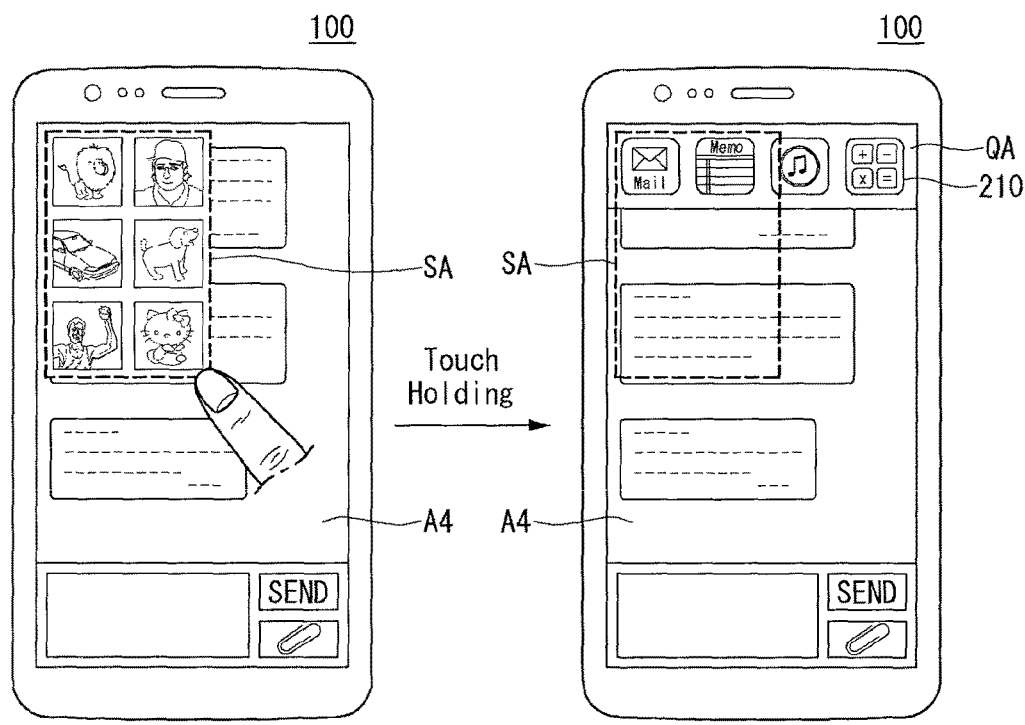

Referring to FIG. 23a, the controller 180 receives the second drag input starting at the second corner and applied in a diagonal direction during execution of the messenger application. The controller 180 generates a virtual area SA according to the second drag input and displays images stored in the gallery in the virtual area SA. Upon release of the second drag input while the virtual area SA is displayed, the controller 180 can display a floating window QA displaying one or more applications, which can be executed in the mobile terminal 100, on the touchscreen 151. Here, the controller 180 can maintain only the layout of the generated virtual area SA and delete the images displayed in the virtual area SA.

Figure 23B:
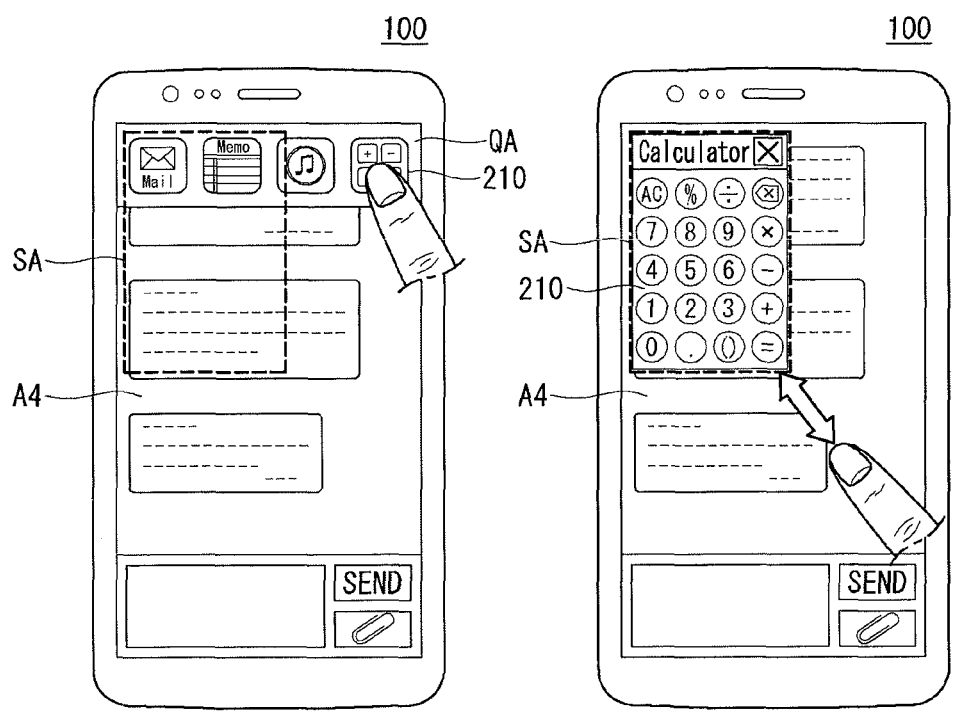

Referring to FIG. 23b, upon reception of input for selecting a specific application from the applications displayed on the floating window QA, the controller 180 can display the selected application inside of the layout of the virtual area SA. The size of the layout of the virtual area SA can be changed by a user. According to an embodiment of the present invention, when drag input starting at a corner of the display unit and applied in a diagonal direction is received while a specific screen is displayed on the display unit, a function of changing display of the specific screen can be executed.

Figure 24:
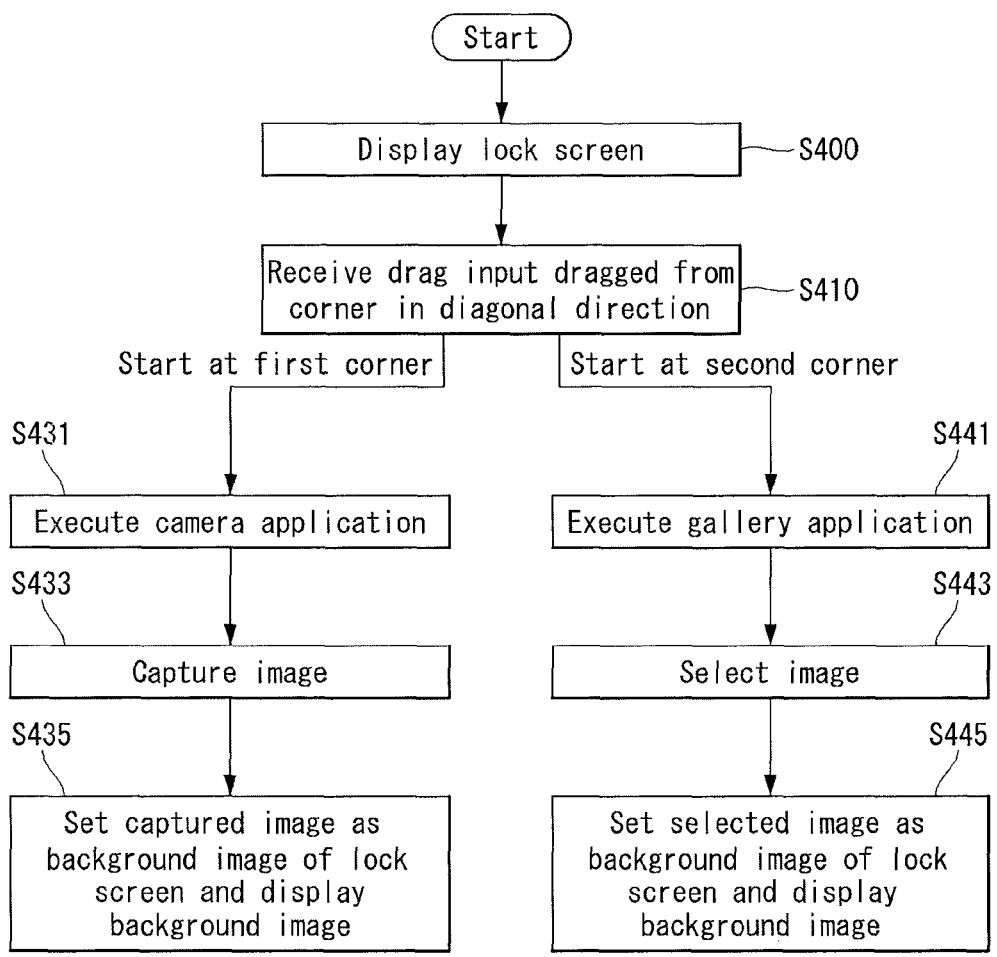
FIG. 24 is a flowchart illustrating a method for controlling a mobile terminal according to a fourth embodiment of the present disclosure.

FIG. 24 is a flowchart illustrating a method for controlling a mobile terminal according to a fourth embodiment of the present invention and FIGS. 25A to 26C are views illustrating an example of implementing the method for controlling a mobile terminal according to the fourth embodiment of the present invention.

The method for controlling a mobile terminal according to the fourth embodiment of the present invention may be implemented in the mobile terminal 100 described above with reference to FIGS. 1a to 1c. A description will be given of the method for controlling a mobile terminal according to the fourth embodiment of the present invention and operations of the mobile terminal 100 to implement the method with reference to the attached drawings. The fourth embodiment of the present invention may be implemented based on the aforementioned first embodiment of the present invention.

Referring to FIG. 24, the controller 180 of the mobile terminal 100 may display a lock screen in a lock mode (S400). The fourth embodiment of the present invention is described on the assumption that the mobile terminal 100 is in the second lock mode state. That is, the controller 180 displays the lock screen on the touchscreen 151 while the mobile terminal 100 is in the second lock mode state.

The controller 180 can receive drag input starting at a specific corner of the touchscreen 151 and applied in a diagonal direction while the lock screen is displayed on the touchscreen 151 (S420). When the drag input starts at the first corner, the controller 180 can execute the camera application (S431). When a predetermined image is captured using the camera application (S433), the controller 180 can set the captured image as a background image of the lock screen and display the background image (S435).

When the drag input starts at the second corner, the controller 180 controls the mobile terminal 100 to enter the gallery application (S441). The controller 180 can receive input for selecting a predetermined image stored through the gallery application (S443). The controller 180 can set the selected image as a background image of the lock screen and display the background image (S445).

Figure 25A:
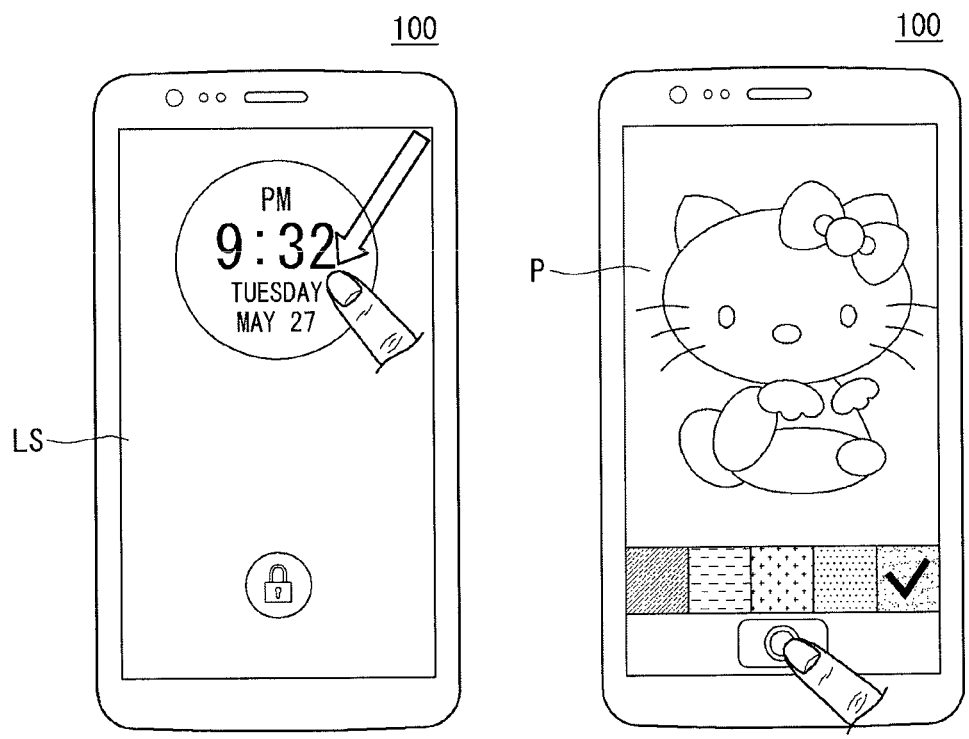
FIGS. 25a to 26c are views illustrating an example of implementing the method for controlling a mobile terminal according to the fourth embodiment of the present disclosure.

Referring to FIG. 25a, the controller 180 can display the lock screen LS on the touchscreen 151 while the mobile terminal 100 is in the second lock mode state. The second lock mode state corresponds to a state in which power is supplied to the touchscreen 151 to enable provision of predetermined information through the touchscreen 151 and the lock mode can be released according to manipulation applied to the touchscreen 151 or other predetermined manipulation, as described above.

Figure 25B:
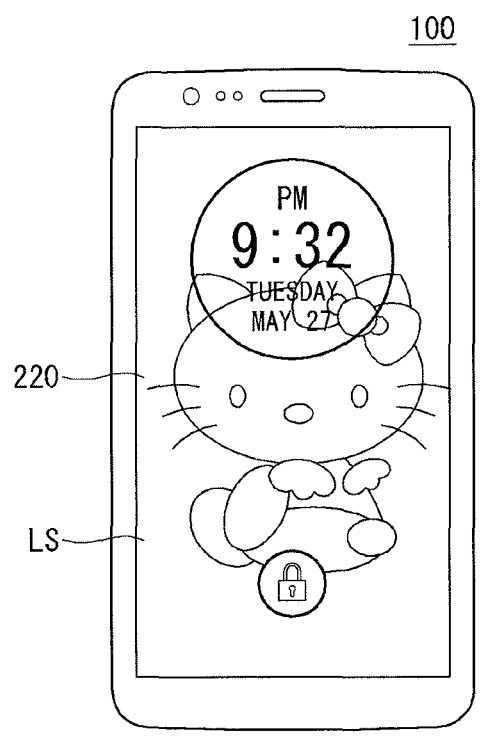

The controller 180 can display a preview image P on the touchscreen 151 by executing the camera application upon reception of the first drag input starting at the first corner and applied in a diagonal direction on the lock screen. Thereafter, when a predetermined image is captured by executing a capture function, the controller 180 can display the captured image as a background image 220 of the lock screen LS without a process of setting a background image of the lock screen LS, as shown in FIG. 25B.

Figure 25C:
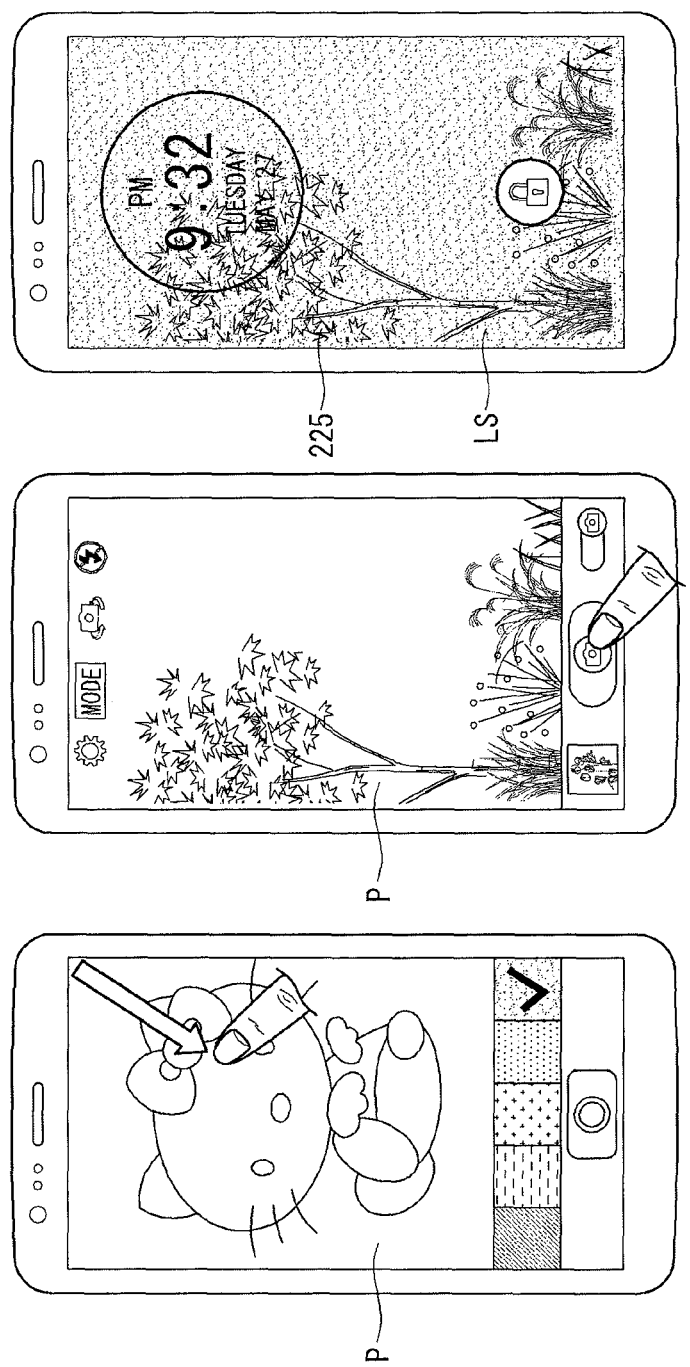

Referring to FIG. 25*c*, when the first drag input starting at the first corner is received again on the camera application execution screen of FIG. 25*a*, the controller 180 can execute a camera application different from the aforementioned camera application to capture an image. The different camera application may be a camera application having more functions than the previously executed camera application. For example, the different camera application may be a camera application having a filter effect. The captured image is displayed as a background image of the lock screen, as described above.

Figure 26A:
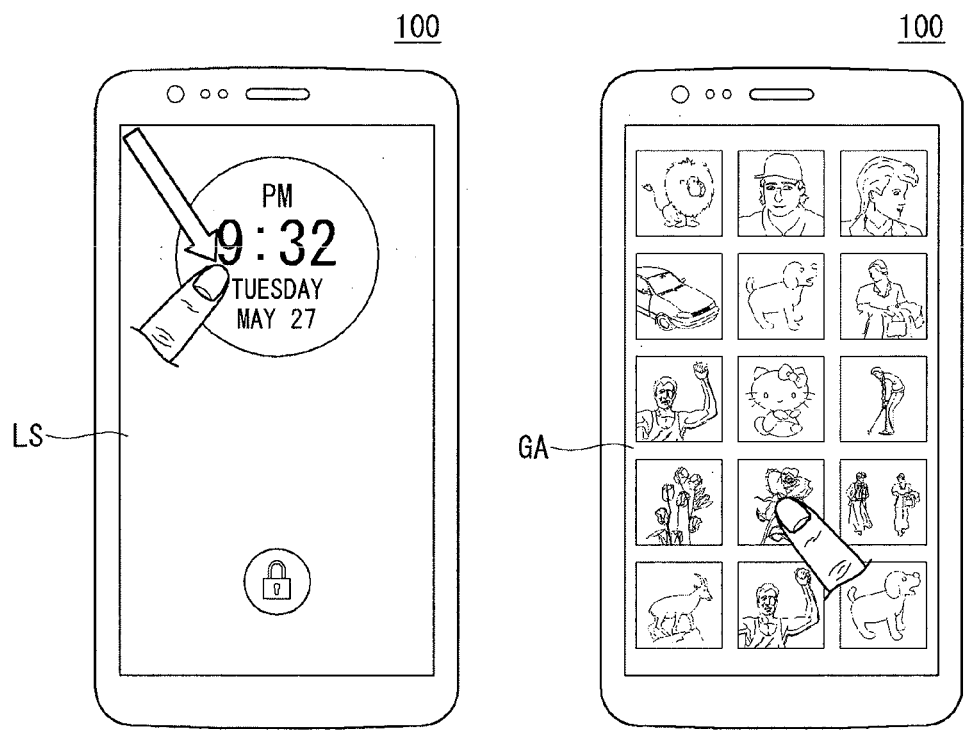
Figure 26B:
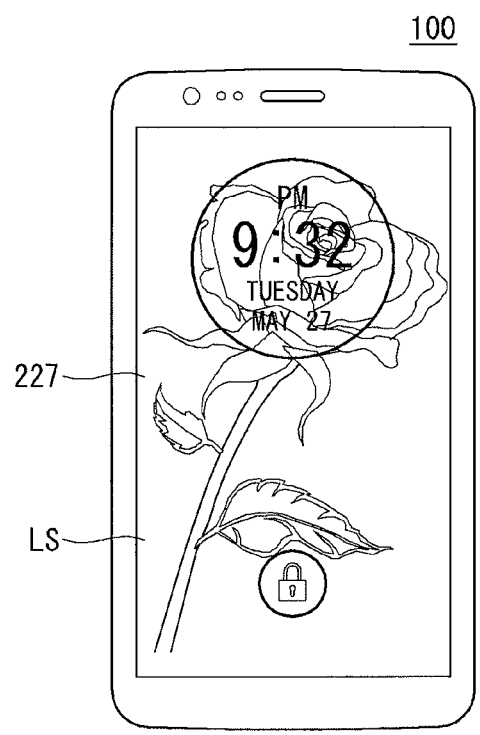

Referring to FIG. 26*a*, the controller 180 can receive the second drag input starting at the second corner and applied in a diagonal direction while the lock screen LS is displayed on the touchscreen 151. The controller 180 can display one or more images I1, I2, . . . , I7) stored in a first gallery on the touchscreen 151 in response to the second drag input. Referring to FIG. 26*a*, upon selection of a specific image from the one or more images I1, I2, . . . , I7, the controller 180 can set the selected image as a background image 227 of the lock screen LS and display the background image 227.

Figure 26C:
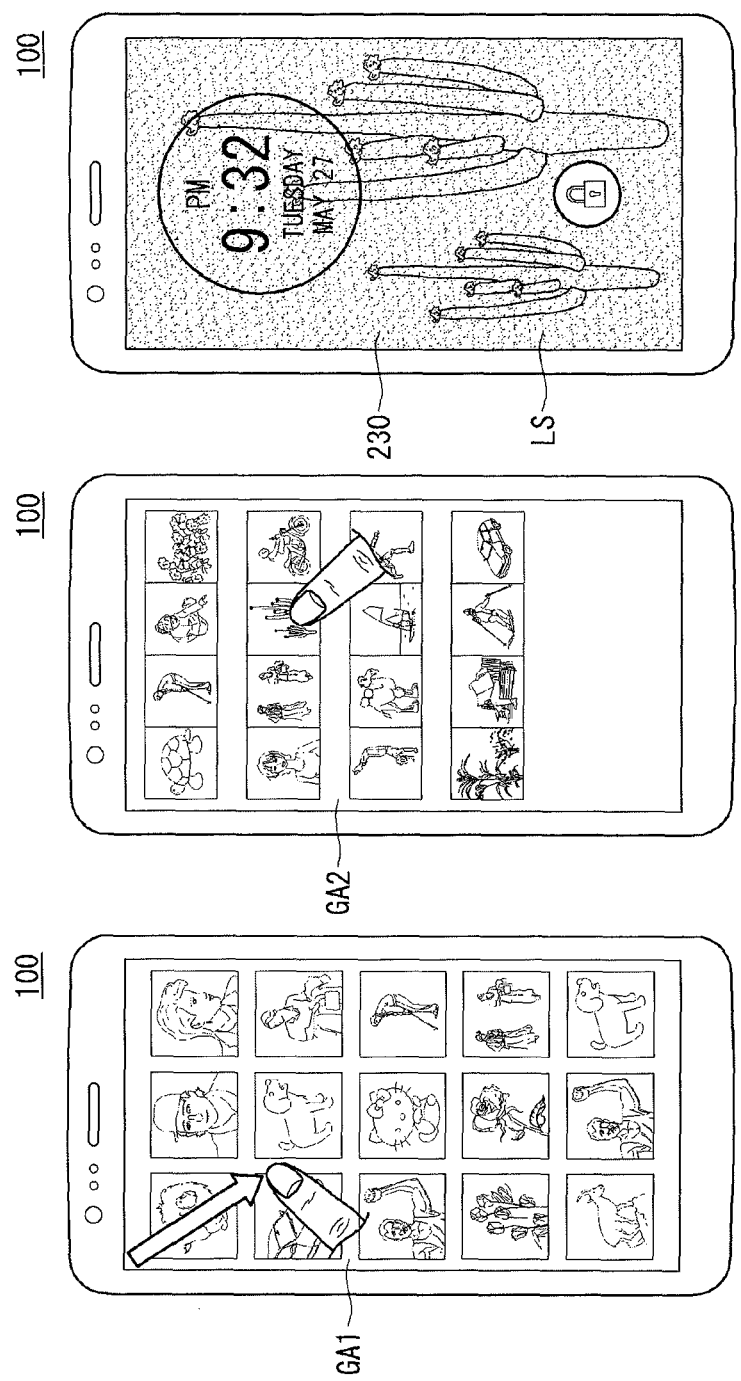

Referring to FIG. 26*c*, upon re-reception of the second drag input starting at the second corner while the images of the first gallery are displayed on the touchscreen 151, the controller 180 can display images of a second gallery GA1 different form the first gallery. When a specific image is selected from the images of the second gallery GA1, the controller 180 can set the selected image as a background image 230 of the lock screen LS and display the background image 230.

Figure 27:
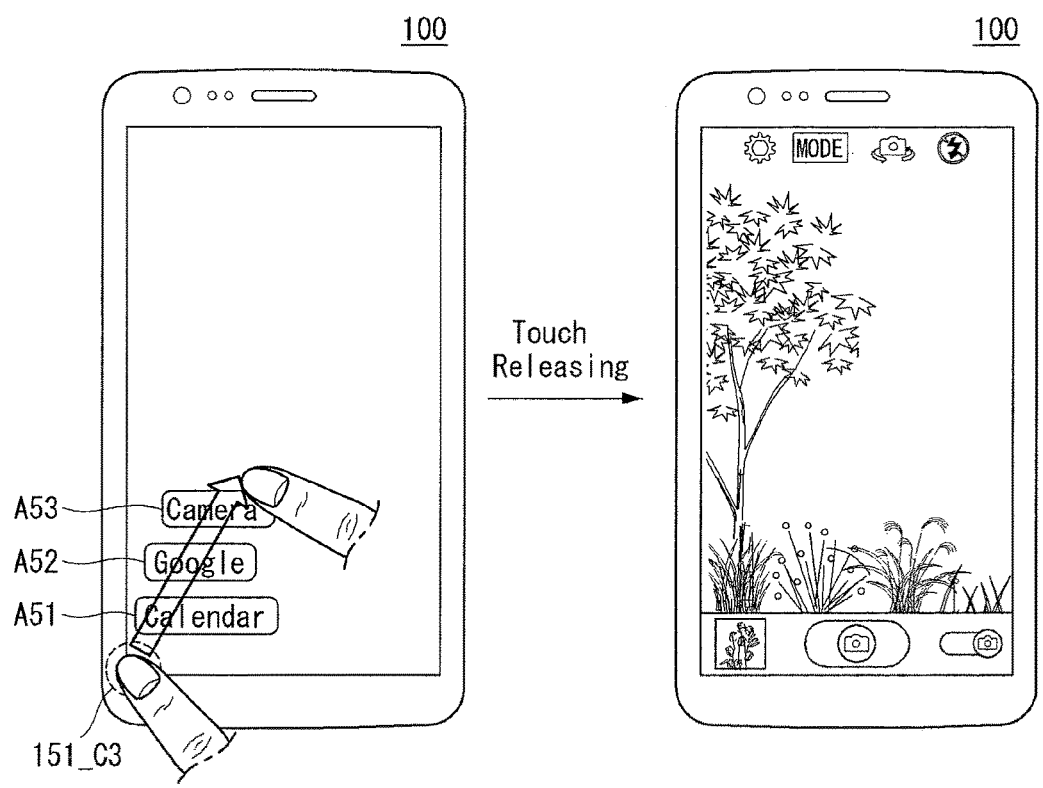
FIGS. 27 to 28b are views illustrating an example of implementing a method for controlling a mobile terminal according to a fifth embodiment of the present disclosure.
Figure 28A:
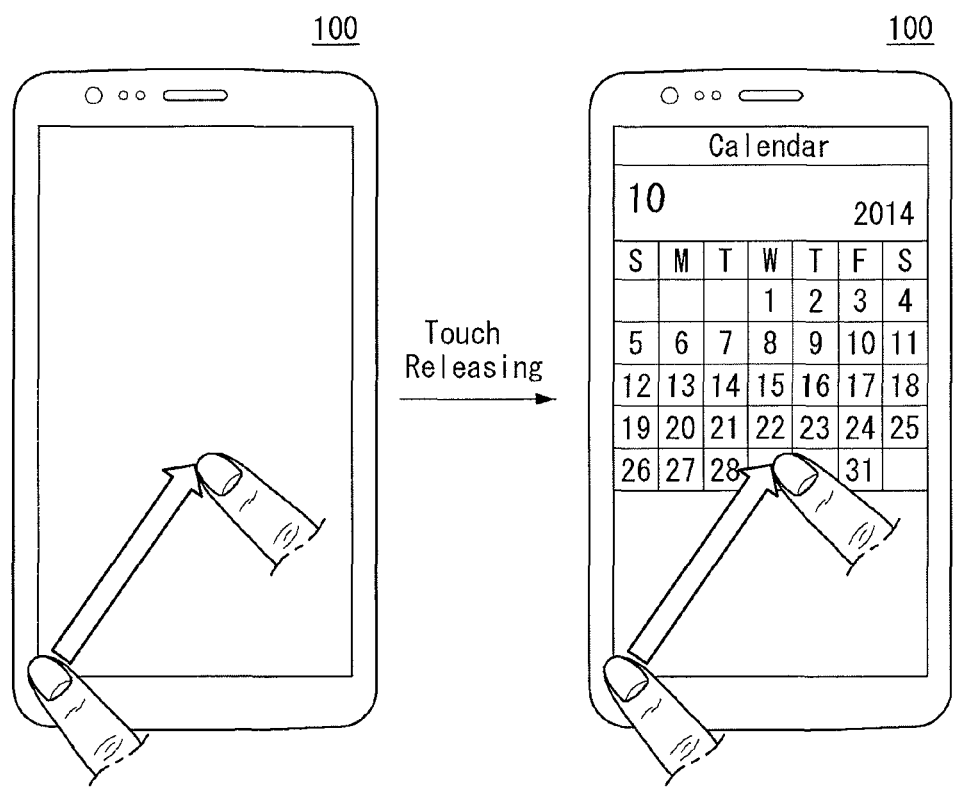

FIGS. 27 to 28*c* are views illustrating a method for controlling a mobile terminal according to a fifth embodiment of the present invention. Referring to FIG. 27, the controller 180 can receive third drag input applied from the third corner of the touchscreen 151 in a diagonal direction. The third corner C3 may correspond to the lower left corner of the touchscreen 151.

Figure 28B:
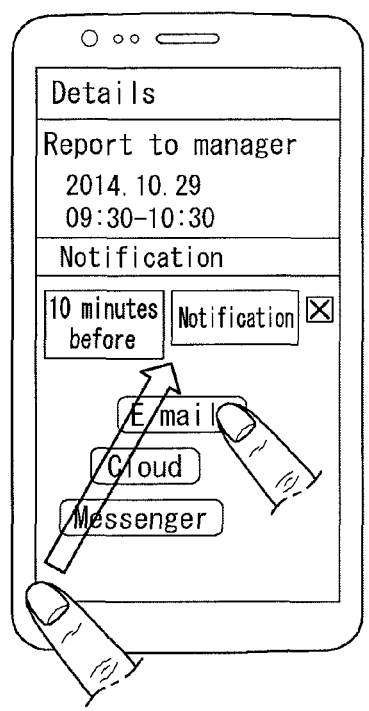

The controller 180 can display one or more application icons on the touchscreen 151 according to the length of the third drag input. The one or more applications may be recently executed applications. For example, when the user has recently used a calendar application A51, a web application A52 and a camera application A53, the applications recently used by the user can be displayed along the drag path upon reception of the third drag input. Upon release of the third drag input at a specific point, the controller 180 can control the mobile terminal 100 to directly enter the application corresponding to the specific point Referring to FIG. 28*a*, the screen displayed according to the third drag input may be a predetermined specific application screen. For example, a calendar application screen can be provided. In addition, the controller 180 can enter a predetermined schedule information input screen through the calendar application screen. Referring to FIG. 28*b*, when the third drag input starting at the third corner is applied again on the schedule information input screen, the controller 180 can display a list of sharing applications for sharing schedule information on the touchscreen 151. The sharing application list may be displayed along the drag path of the third drag input and more applications may be displayed depending on the length of the drag input.

A description will be given of the advantages of the mobile terminal and the method for controlling the same according to an embodiment of the present invention. According to at least one embodiment of the present invention, it is possible to access a desired function more rapidly by inputting a predetermined touch pattern while the display unit is turned off. According to at least one embodiment of the present invention, it is possible to rapidly capture an image at a desired time by automatically operating a camera according to predetermined drag input starting at a corner of the touchscreen while the display unit is turned off.

Those skilled in the art will appreciate that the present invention may be performed in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
   a body;
   a memory;
   a camera;
   a touchscreen provided to the front side of the body and having a plurality of corners; and
   a controller configured to:

operate the camera to capture and store an image in the memory upon reception of a first drag input applied to the touchscreen, wherein the first drag input includes a plurality of discontinuous drag inputs from a first corner of the touchscreen to a second corner of the touchscreen, and wherein the controller is configured to control the camera to capture a first image when the first drag input is discontinued a first time, control the camera to capture a second image when the first drag input is discontinued a second time, and control the camera to capture a third image when the first drag input is discontinued a third time.

2. The mobile terminal of claim 1, wherein the first drag input is received while the touchscreen is turned off.

3. The mobile terminal of claim 2, wherein the controller is configured to perform a burst shot in response to the first drag input being held at a point on the drag input for a predetermined time.

4. The mobile terminal of claim 2, wherein the controller is configured to operate a first camera provided to the front side of the body to capture a first image in response to the first drag input when the first corner corresponds to an upper corner of the touchscreen and to operate a second camera provided to the backside of the body to capture a second image in response to the first drag input when the first corner corresponds to a lower corner of the touchscreen.

5. The mobile terminal of claim 2, wherein the controller is configured to enter a dual camera mode by activating both a first camera provided to the front side of the body and a second camera provided to the backside of the body in response to the first drag input being received while a preview image is displayed on the touchscreen according to the operation of the camera.

6. The mobile terminal of claim 5, wherein the controller is configured to display at least one recently captured image on a window generated in response to the second drag input when the received notification message is not present and to execute a gallery application upon release of the second drag input.

7. The mobile terminal of claim 2, wherein the controller is configured to:

check whether a received notification message is present upon reception of a second drag input applied to a second corner of the touchscreen and dragged to the center of the touchscreen, and display one or more application icons related to the received notification message along a drag path of the second drag input when the received notification message is present.

8. The mobile terminal of claim 7, wherein one of the first corner and the second corner corresponds to one of left and right corners of the touchscreen and the other one of the first corner and the second corner corresponds to the other of the touchscreen.

9. The mobile terminal of claim 7, wherein the received notification message includes at least one of a number of unread text messages, a number of unanswered calls and application update information.

10. The mobile terminal of claim 7, wherein the controller is configured to execute a first application corresponding to a point at which the second drag input is released upon release of the second drag input.

11. The mobile terminal of claim 10, wherein the controller is configured to execute a second application displayed along the drag path in response to the second drag input being received during execution of the first application.

12. The mobile terminal of claim 7, wherein the controller is configured to hold display of the one or more application icons in response to the second drag input being held at a specific point on the drag path for a predetermined time.

13. The mobile terminal of claim 1, wherein the controller is configured to display information related to a specific application on the touchscreen upon reception of the first drag input while an execution screen of the specific application is displayed on the touchscreen.

14. The mobile terminal of claim 1, wherein the controller is configured to:

display a lock screen corresponding to a lock mode on the touchscreen, and set an image captured by operating the camera as a background image of the lock screen in response to the first drag input being received while the lock screen is displayed.

15. The mobile terminal of claim 1, wherein the controller is configured to display one or more application icons along a drag path of a third drag input in response to the third drag input being applied to a third corner of the touchscreen and dragged to the center of the touchscreen.

16. A method for controlling a mobile terminal, the method comprising:

receiving a first drag input applied to a touchscreen; and operating a camera of the mobile terminal to capture and store an image in the memory reception of the first drag input applied to the touchscreen, wherein the first drag input includes a plurality of discontinuous drag inputs from a first corner of the touchscreen to a second corner of the touchscreen, and wherein the method further comprises capturing, via the camera, a first image when the first drag input is discontinued a first time, a second image when the first drag input is discontinued a second time, and a third image when the first drag input is discontinued a third time.

17. The method of claim 16, wherein the first drag input is received while the touchscreen is turned off.

18. The method of claim 17, further comprising:

receiving a second drag input applied to a second corner of the touchscreen and dragged to the center of the touchscreen;

displaying at least one application icon related to a received notification message along a drag path of the second drag input when the received notification message is present; and executing an application corresponding to a point at which the second drag input is released, upon release of the second drag input.

* * * * *